(12) United States Patent
Ito

(10) Patent No.: US 7,492,524 B2
(45) Date of Patent: Feb. 17, 2009

(54) ZOOM LENS SYSTEM, IMAGING APPARATUS, METHOD FOR VIBRATION REDUCTION, AND METHOD FOR VARYING FOCAL LENGTH

(75) Inventor: Tomoki Ito, Kawasaki (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 11/779,830

(22) Filed: Jul. 18, 2007

(65) Prior Publication Data

US 2008/0019018 A1   Jan. 24, 2008

(30) Foreign Application Priority Data

Jul. 20, 2006 (JP) ............................. 2006-198453
Dec. 18, 2006 (JP) ............................. 2006-340332

(51) Int. Cl.
*G02B 15/14* (2006.01)
(52) U.S. Cl. .................. 359/683; 359/34; 359/685; 359/686; 359/687; 359/715; 359/740; 359/774
(58) Field of Classification Search ................ 359/554, 359/683–687, 715, 740, 774
See application file for complete search history.

(56) References Cited

U.S. PATENT DOCUMENTS

| 6,025,962 | A | 2/2000 | Suzuki | |
|---|---|---|---|---|
| 6,462,885 | B2 | 10/2002 | Nishio | |
| 7,253,965 | B2* | 8/2007 | Shibayama et al. | 359/687 |
| 7,277,235 | B2 | 10/2007 | Sensui | |
| 7,336,425 | B2* | 2/2008 | Obama et al. | 359/683 |
| 2005/0083584 | A1* | 4/2005 | Ito et al. | 359/687 |
| 2005/0088756 | A1* | 4/2005 | Yamada | 359/687 |
| 2006/0215278 | A1* | 9/2006 | Ori | 359/687 |

FOREIGN PATENT DOCUMENTS

| EP | 1 643 293 A | 4/2006 |
|---|---|---|
| JP | 2001-166208 A | 6/2001 |
| JP | 2002-006217 | 1/2002 |
| JP | 2003-140048 | 5/2003 |
| JP | 2003-295060 | 10/2003 |

\* cited by examiner

*Primary Examiner*—Evelyn A. Lester
(74) *Attorney, Agent, or Firm*—Miles & Stockbridge P.C.

(57) ABSTRACT

Providing a zoom lens system with a vibration reduction function, a high zoom ratio, and a wide angle of view, an imaging apparatus, a method for vibration reduction, and a method for varying a focal length. The system includes, in order from an object, a first lens group having positive power, a second lens group having negative power, a third lens group having positive power, and a fourth lens group having positive power. Upon zooming from a wide-angle end to a telephoto end, a distance between the first and the second lens groups increases, a distance between the second and the third lens groups decreases, and a distance between the third and the fourth lens groups varies. The third lens group consists of a front group and a rear group. Vibration reduction is carried out by moving only the rear group perpendicularly to the optical axis. Given conditions are satisfied.

52 Claims, 25 Drawing Sheets

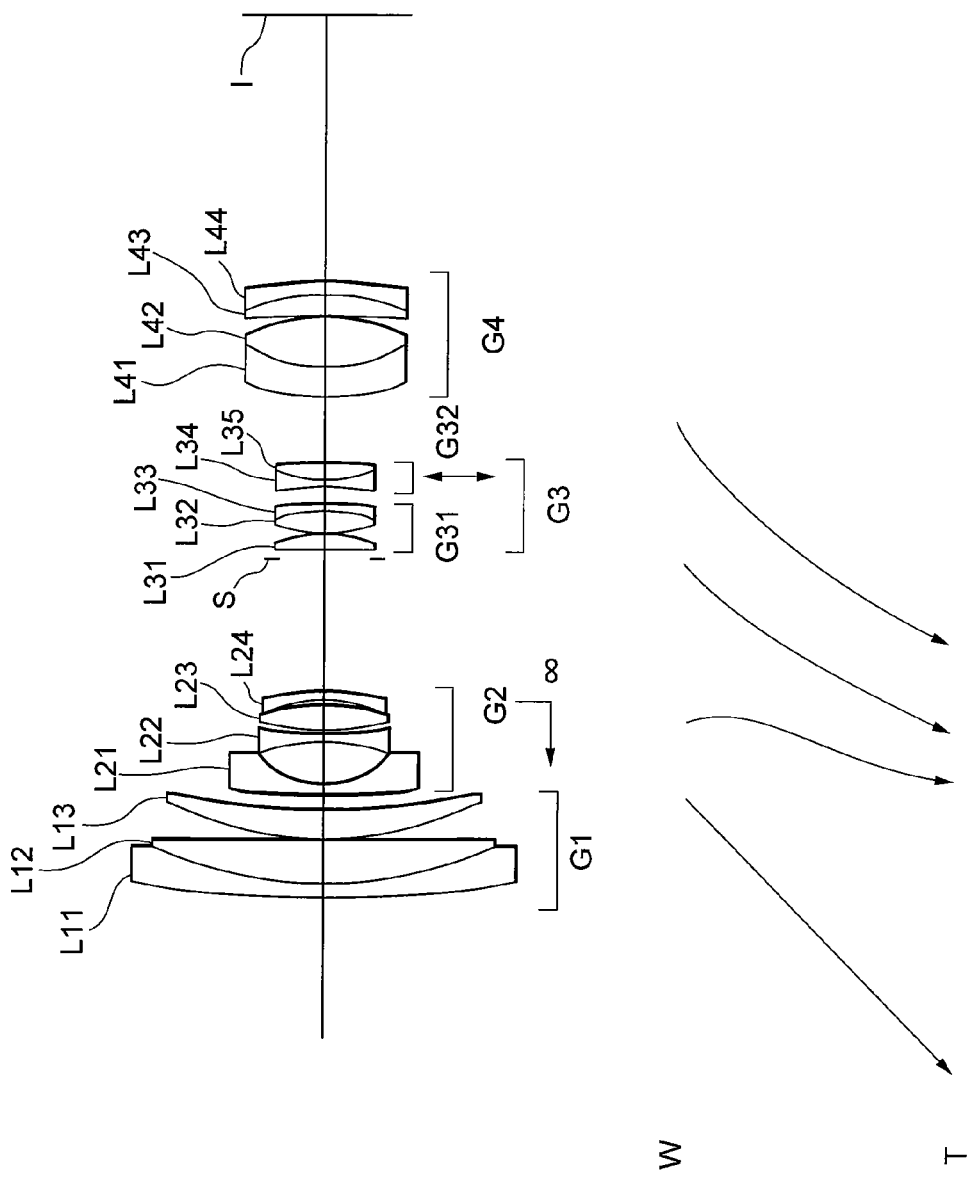

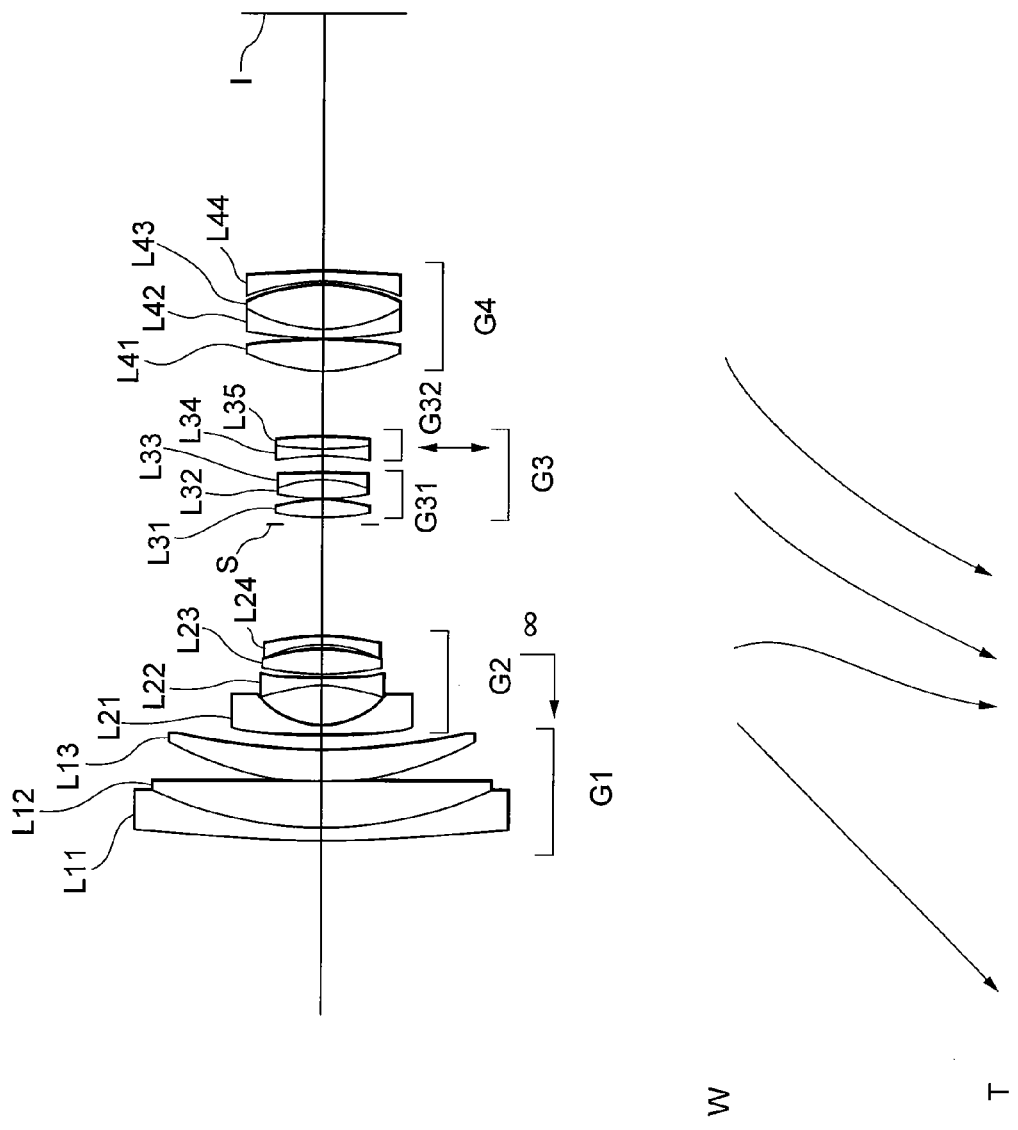

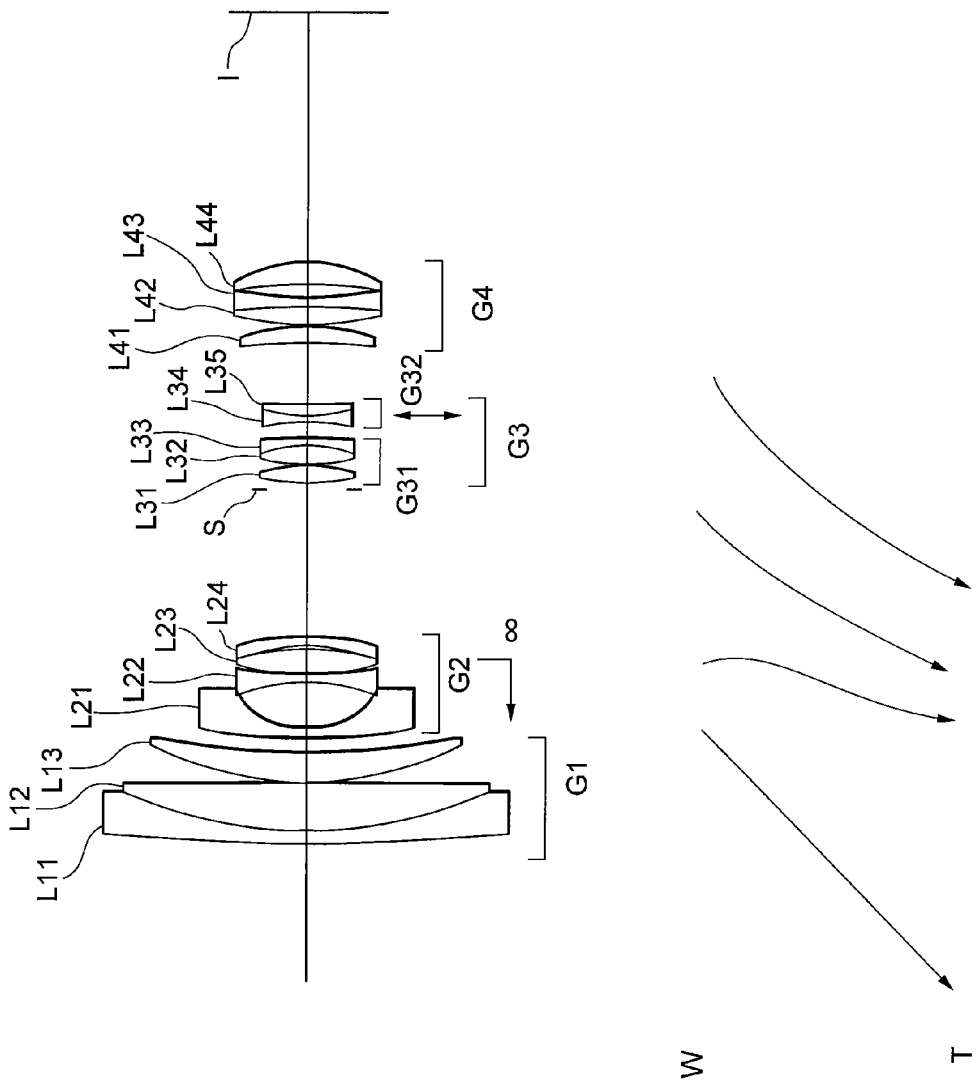

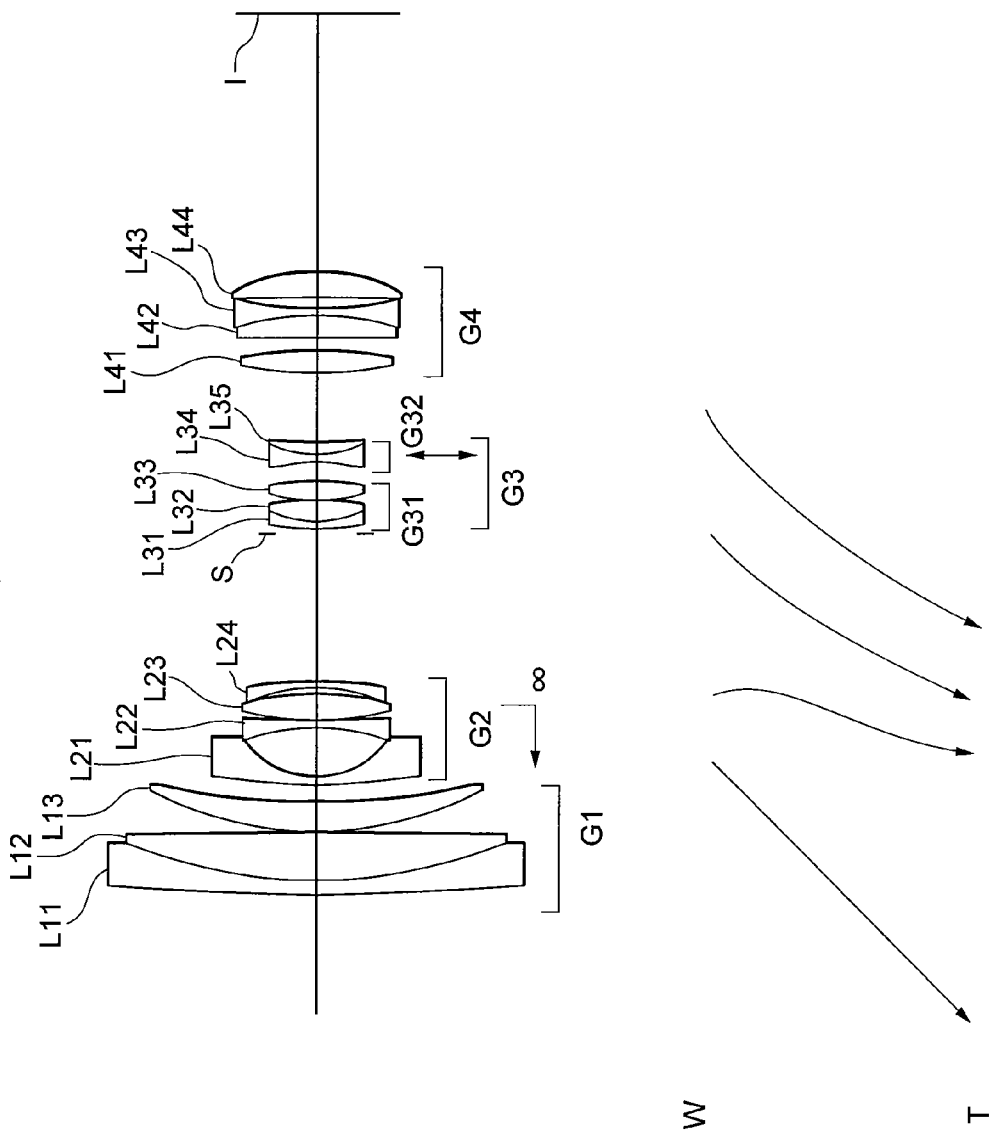

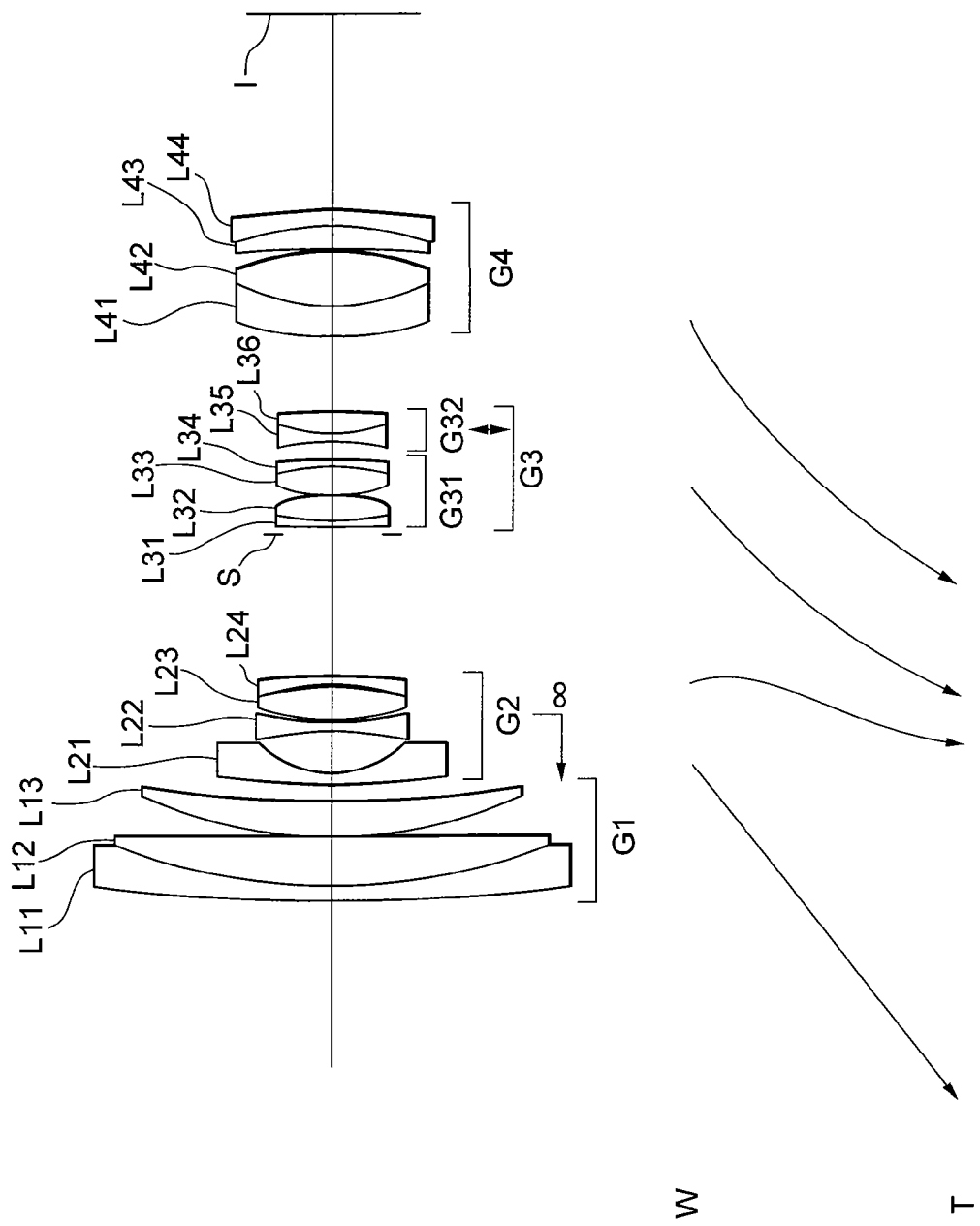

ZOOM LENS SYSTEM, IMAGING APPARATUS, METHOD FOR VIBRATION REDUCTION, AND METHOD FOR VARYING FOCAL LENGTH

The disclosure of the following priority applications are herein incorporated by reference:

Japanese Patent Application No. 2006-198453 filed on Jul. 20, 2006; and

Japanese Patent Application No. 2006-340332 filed on Dec. 18, 2006.

BACKGROUND OF THE INVENTION

1. Field of the Invention

The present invention relates to a zoom lens system, an imaging apparatus, a method for vibration reduction, and a method for varying a focal length of the zoom lens system.

2. Related Background Art

A zoom lens system having a vibration reduction function has been proposed in such as Japanese Patent application Laid-Open No. 2001-166208.

However, because of a small zoom ratio thereof, the zoom lens system cannot sufficiently meet the demand to have a high zoom ratio. Moreover, because of a narrow angle of view in a wide-angle end state, the zoom lens system cannot sufficiently meet the demand to have a wide angle of view.

SUMMARY OF THE INVENTION

The present invention is made in view of the aforementioned problems and has an object to provide a zoom lens system having a high zoom ratio and a wide angle of view with a vibration reduction function, and to provide an imaging apparatus, and a method for vibration reduction, and a method for varying a focal length of the zoom lens system.

According to a first aspect of the present invention, there is provided a zoom lens system comprising, in order from an object: a first lens group having positive refractive power; a second lens group having negative refractive power; a third lens group having positive refractive power; and a fourth lens group having positive refractive power; upon zooming from a wide-angle end state to a telephoto end state, a distance between the first lens group and the second lens group varying, a distance between the second lens group and the third lens group varying, and a distance between the third lens group and the fourth lens group varying; the third lens group comprising, in order from the object, a front group having positive refractive power, and a rear group having negative refractive power; wherein the rear group is movable in a direction substantially perpendicular to the optical axis, and the following conditional expression (1) is satisfied:

$$2.95 < f3/fw < 8.0 \qquad (1)$$

where fw denotes a focal length of the zoom lens system in the wide-angle end state, and f3 denotes a focal length of the third lens group.

According to a second aspect of the present invention, there is provided an imaging apparatus equipped with the zoom lens system according to the first aspect.

According to a third aspect of the present invention, there is provided a method for varying a focal length of a zoom lens system that includes, in order from an object, a first lens group having positive refractive power, a second lens group having negative refractive power, a third lens group having positive refractive power, and a fourth lens group having positive refractive power, the method comprising steps of: providing the third lens group that comprises, in order from the object, a front group having positive refractive power, and a rear group having negative refractive power; providing the rear group movable in the direction substantially perpendicular to the optical axis; satisfying the following conditional expression:

$$2.95 < f3/fw < 8.0$$

where fw denotes a focal length of the zoom lens system in a wide-angle end state, and f3 denotes a focal length of the third lens group; and varying a focal length from a wide-angle end state to a telephoto end state by varying a distance between the first lens group and the second lens group, varying a distance between the second lens group and the third lens group, and varying a distance between the third lens group and the fourth lens group.

According to a fourth aspect of the present invention, there is provided a zoom lens system comprising, in order from an object: a first lens group having positive refractive power; a second lens group having negative refractive power; a third lens group having positive refractive power; and a fourth lens group having positive refractive power, upon zooming from a wide-angle end state to a telephoto end state, a distance between the first lens group and the second lens group varying, a distance between the second lens group and the third lens group varying, and a distance between the third lens group and the fourth lens group varying, the third lens group comprising, in order from the object, a front group having positive refractive power, and a rear group having negative refractive power, wherein the rear group is movable in a direction substantially perpendicular to the optical axis and the following conditional expression (3) is satisfied:

$$-0.275 < f2/f3 < -0.100 \qquad (3)$$

where f2 denotes a focal length of the second lens group, and f3 denotes the focal length of the third lens group.

According to a fifth aspect of the present invention, there is provided an imaging apparatus equipped with the zoom lens system according to the fourth aspect of the present invention.

According to a sixth aspect of the present invention, there is provided a method for varying a focal length of a zoom lens system that includes, in order from an object, a first lens group having positive refractive power, a second lens group having negative refractive power, a third lens group having positive refractive power, and a fourth lens group having positive refractive power, the method comprising steps of: providing the third lens group that comprises, in order from the object, a front group having positive refractive power, and a rear group having negative refractive power; providing the rear group movable in the direction substantially perpendicular to the optical axis; satisfying the following conditional expression (3):

$$-0.275 < f2/f3 < -0.100 \qquad (3)$$

where f2 denotes a focal length of the second lens group, and f3 denotes the focal length of the third lens group; and varying a focal length from a wide-angle end state to a telephoto end state by varying a distance between the first lens group and the second lens group, varying a distance between the second lens group and the third lens group, and varying a distance between the third lens group and the fourth lens group.

Other features and advantages according to the present invention will be readily understood from the detailed description of the most preferred embodiments in conjunction with the accompanying drawings.

BRIEF DESCRIPTION OF THE DRAWINGS

FIG. 1 is a diagram showing a lens configuration of a zoom lens system according to Example 1 of a first embodiment and a zoom lens system according to Example 6 of a second embodiment together with a zooming trajectory of each lens group.

FIG. 5 is a diagram showing a lens configuration of a zoom lens system according to Example 2 of the first embodiment and a zoom lens system according to Example 8 of the second embodiment together with a zooming trajectory of each lens group.

FIG. 9 is a diagram showing a lens configuration of a zoom lens system according to Example 3 of the first embodiment and a zoom lens system according to Example 9 of the second embodiment together with a zooming trajectory of each lens group.

FIG. 17 is a diagram showing a lens configuration of a zoom lens system according to Example 5 of the first embodiment and a zoom lens system according to Example 11 of the second embodiment together with a zooming trajectory of each lens group.

FIG. 21 is a diagram showing a lens configuration of a zoom lens system according to Example 7 of the second embodiment together with a zooming trajectory of each lens group.

DESCRIPTION OF THE MOST PREFERRED EMBODIMENT

First Embodiment

Figure 2A:
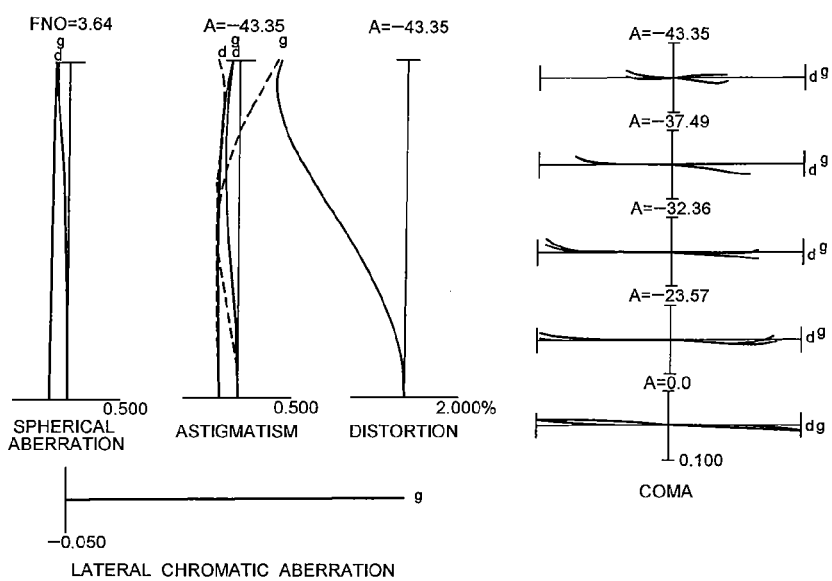
FIGS. 2A and 2B are graphs showing various aberrations and coma upon correcting rotational blur of 0.80°, respectively, of the zoom lens system according to Example 1 of the first embodiment and the zoom lens system according to Example 6 of a second embodiment in a wide-angle end state focusing on infinity.

A zoom lens system, an imaging apparatus, a method for vibration reduction, and a method for varying a focal length according to a first embodiment are explained below.

A zoom lens system according to the first embodiment includes, in order from an object, a first lens group having positive refractive power, a second lens group having negative refractive power, a fourth lens group having positive refractive power. Upon zooming from a wide-angle end state to a telephoto end state, a distance between the first lens group and the second lens group increases, a distance between the second lens group and the third lens group decreases, and a distance between the third lens group and the fourth lens group varies. The third lens group consists of, in order from the object, a front group having positive refractive power, and a rear group having negative refractive power. Vibration reduction upon occurring a camera shake is carried out by moving only the rear group in a direction substantially perpendicular to the optical axis. The following conditional expression (1) is satisfied:

$$2.95 < f3/fw < 8.0 \quad (1)$$

where fw denotes a focal length of the zoom lens system in the wide-angle end state, and f3 denotes a focal length of the third lens group.

Since the third lens group can be made smaller in the diameter than the other lens groups, the third lens group is suitable for being equipped with a vibration reduction mechanism. With consisting the third lens group of the front group having positive refractive power and the rear group having negative refractive power, and with using only the rear group as a vibration reduction lens group, the vibration reduction mechanism can be compact, and the weight of the vibration reduction lens group can be reduced. Moreover, lens power distribution of the third lens group can be properly arranged. Accordingly, when vibration reduction is carried out by moving the rear group in a direction substantially perpendicular to the optical axis upon occurring a camera shake, deterioration of optical performance can be made small.

Conditional expression (1) defines an appropriate range of the focal length of the third lens group with respect to the focal length of the zoom lens system in the wide-angle end state.

When the ratio f3/fw is equal to or falls below the lower limit of conditional expression (1), astigmatism and curvature of field in the wide-angle end state increase. In order to secure the effect of the present invention, it is preferable to set the lower limit of conditional expression (1) to 3.00.

On the other hand, when the ratio f3/fw is equal to or exceeds the upper limit of conditional expression (1), moving amounts of the third lens group and the fourth lens group become large, so that it becomes difficult to accomplish compactness of the zoom lens system. When refractive power of the first lens group and the second lens group are made large in order to mitigate the effect, increase in spherical aberration in the telephoto end state becomes large, so that it is undesirable. In order to secure the effect of the present invention, it is preferable to set the upper limit of conditional expression (1) to 6.00.

A zoom lens system according to the first embodiment preferably satisfies the following conditional expression (2):

$$0.56 < f3/ft < 2.0 \quad (2)$$

where ft denotes a focal length of the zoom lens system in the telephoto end state, and f3 denotes a focal length of the third lens group.

When the ratio f3/ft is equal to or falls below the lower limit of conditional expression (2), decentering coma generated by a production error such as relative decentering between lens groups becomes conspicuous, so that it is undesirable. Moreover, increase in spherical aberration in the telephoto end state becomes large. In order to secure the effect of the present invention, it is preferable to set the lower limit of conditional expression (2) to 0.60.

On the other hand, when the ratio f3/ft is equal to or exceeds the upper limit of conditional expression (2), the total lens length and the diameter of the zoom lens system become large, so that it becomes difficult to put it to practical use. Moreover, the aperture stop and the vibration reduction mechanism become large, so that it is undesirable. When refractive power of the second lens group is made large to mitigate the effect, astigmatism and curvature of field in the wide-angle end state become worse, so that it is undesirable. In order to secure the effect of the present invention, it is preferable to set the upper limit of conditional expression (2) to 1.50.

In a zoom lens system according to the first embodiment, it is preferable to satisfy the following conditional expression (3):

$$-0.275 < f2/f3 < -0.100 \quad (3)$$

where f2 denotes a focal length of the second lens group, and f3 denotes the focal length of the third lens group.

Conditional expression (3) defines an appropriate range of the focal length of the second lens group with respect to that of the third lens group.

When the ratio f2/f3 is equal to or falls below the lower limit of conditional expression (3), it becomes difficult to simultaneously correct coma in the wide-angle end state, spherical aberration in the telephoto end state, and variation in curvature of field upon vibration reduction, so that it is undesirable.

On the other hand, when the ratio f2/f3 is equal to or exceeds the upper limit of conditional expression (3), refractive power of the second lens group becomes large, and deterioration in astigmatism and curvature of field in the wide-angle end state becomes conspicuous, so that it is undesirable. In order to secure the effect of the present invention, it is preferable to set the upper limit of conditional expression (3) to −0.15.

In a zoom lens system according to the first embodiment, it is preferable that the first lens group, the third lens group, and the fourth lens group are moved upon zooming from the wide-angle end state to the telephoto end state.

With this lens configuration, it becomes possible to simplify the moving mechanism for moving each lens group, so that the zoom lens system can be compact.

In a zoom lens system according to the first embodiment, the following conditional expression (4) is preferably satisfied:

$$0 < D3W - D3T \quad (4)$$

where D3W denotes a distance between the third lens group and the fourth lens group in the wide-angle end state, and D3T denotes a distance between the third lens group and the fourth lens group in the telephoto end state.

Conditional expression (4) defines an appropriate range of difference between the distance from the third lens group to the fourth lens group in the wide-angle end state and that in the telephoto end state.

When the value D3W−D3T is equal to or falls below the lower limit of conditional expression (4), it becomes impossible to suppress variation in curvature of field upon zooming from the wide-angle end state to the telephoto end state, so that it is undesirable. In order to secure the effect of the present invention, it is preferable to set the lower limit of conditional expression (4) to 2.0.

In a zoom lens system according to the first embodiment, the following conditional expression (5) is preferably satisfied:

$$0.24 < f31/ft < 0.41 \quad (5)$$

where ft denotes a focal length of the zoom lens system in the telephoto end state, and f31 denotes a focal length of the front group.

Conditional expression (5) defines an appropriate range of the focal length of the front group with respect to the focal length of the zoom lens system in the telephoto end state.

When the ratio f31/ft is equal to or falls below the lower limit of conditional expression (5), a moving amount of the image with respect to the moving amount of the rear group upon vibration reduction becomes large. Accordingly, it becomes difficult to control decentering of the rear group, and a minute decentering error causes deterioration in optical performance, so that it becomes difficult to correct decentering coma.

On the other hand, when the ratio f31/ft is equal to or exceeds the upper limit of conditional expression (5), a moving amount of the image with respect to the moving amount of the rear group upon vibration reduction becomes small. Accordingly, the moving amount of the rear group to obtain the moving amount of the image necessary for vibration reduction becomes large, so that it becomes difficult to correct variation in the image plane and decentering coma upon vibration reduction. In order to secure the effect of the present invention, it is preferable to set the upper limit of conditional expression (5) to 0.38.

In a zoom lens system according to the first embodiment, the following conditional expression (6) is preferably satisfied:

$$2.15 < Bfw/fw < 3.50 \quad (6)$$

where fw denotes a focal length of the zoom lens system in the wide-angle end state, and Bfw denotes a back focal length of the zoom lens system in the wide-angle end state.

Conditional expression (6) defines an appropriate range of the back focal length upon using the zoom lens system in an interchangeable lens type single-lens reflex digital camera.

When the ratio Bfw/fw is equal to or exceeds the upper limit of conditional expression (6), the back focal length becomes too large, so that the total lens length becomes large. Moreover, when the back focal length is made to be small, astigmatism and curvature of field in the wide-angle end state becomes worse. In order to secure the effect of the present invention, it is preferable to set the upper limit of conditional expression (6) to 3.00.

On the other hand, when the ratio Bfw/fw is equal to or falls below the lower limit of conditional expression (6), the back focal length becomes too small, so that the image side of the zoom lens system, in other words, the rear portion of the zoom lens system interferes with a quick return mirror of a SLR camera. In order to secure the effect of the present invention, it is preferable to set the lower limit of conditional expression (6) to 2.20.

In a zoom lens system according to the first embodiment, the following conditional expression (7) is preferably satisfied:

$$1.4 < f3/f4 < 5.0 \quad (7)$$

where f3 denotes the focal length of the third lens group, and f4 denotes the focal length of the fourth lens group.

Conditional expression (7) defines an appropriate range of the focal length of the third lens group and that of the fourth lens group.

When the ratio f3/f4 is equal to or falls below the lower limit of conditional expression (7), refractive power of the third lens group becomes large, so that spherical aberration in the telephoto end state becomes worse.

On the other hand, when the ratio f3/f4 is equal to or exceeds the upper limit of conditional expression (7), refractive power of the fourth lens group becomes large, so that it becomes difficult to correct curvature of field and coma.

In order to secure the effect of the present invention, it is preferable to set the upper limit of the conditional expression (7) to 3.0.

In a zoom lens system according to the first embodiment, it is preferable that the most object side lens surface of the rear group is an aspherical surface.

With this construction, it becomes possible to sufficiently suppress deterioration in decentering coma upon decentering the rear group.

In a zoom lens system according to the first embodiment, at least one aspherical surface is preferably included in the fourth lens group.

With this construction, it becomes possible to preferably correct distortion, curvature of field, and astigmatism in the wide-angle end state and spherical aberration and coma in the telephoto end state.

In a zoom lens system according to the first embodiment, focusing is preferably carried out by moving the second lens group along the optical axis.

Since refractive power of the second lens group is large, moving amount of the second lens group can be small. Accordingly, the total lens length of the zoom lens system does not become large. Since the second lens group is lighter in weight than the first lens group, a burden on a drive mechanism can be reduced.

An imaging apparatus according to the first embodiment is equipped with the above-mentioned zoom lens system.

With this construction, it becomes possible to provide an imaging apparatus having a high zoom ratio and a wide angle of view with a vibration reduction function.

A method for carrying out vibration reduction of a zoom lens system according to the first embodiment that includes, in order from an object, a first lens group having positive refractive power, a second lens group having negative refractive power, a third lens group having positive refractive power, and a fourth lens group having positive refractive power, the method comprising steps of: varying a focal length from a wide-angle end state to a telephoto end state by increasing a distance between the first lens group and the second lens group, decreasing a distance between the second lens group and the third lens group, and varying a distance between the third lens group and the fourth lens group; satisfying the following conditional expression (1):

$$2.95 < f3/fw < 8.0 \quad (1)$$

where fw denotes a focal length of the zoom lens system in a wide-angle end state, and f3 denotes a focal length of the third lens group; providing the third lens group that consists of, in order from the object, a front group having positive refractive power, and a rear group having negative refractive power; and carrying out correction of the image plane by moving only the rear group in the direction substantially perpendicular to the optical axis upon occurring a camera shake.

With this method, it becomes possible to realize a zoom lens system with a vibration reduction function to have a high zoom ratio and a wide angle of view.

A method for varying a focal length of a zoom lens system according to the first embodiment that includes, in order from an object, a first lens group having positive refractive power, a second lens group having negative refractive power, a third lens group having positive refractive power, and a fourth lens group having positive refractive power, the method comprising steps of: providing the third lens group that consists of, in order from the object, a front group having positive refractive power, and a rear group having negative refractive power; carrying out correction of the image plane by moving only the rear group in the direction substantially perpendicular to the optical axis upon occurring a camera shake; satisfying the following conditional expression (1):

$$2.95 < f3/fw < 8.0 \quad (1)$$

where fw denotes a focal length of the zoom lens system in a wide-angle end state, and f3 denotes a focal length of the third lens group; and varying a focal length from a wide-angle end state to a telephoto end state by increasing a distance between the first lens group and the second lens group, decreasing a distance between the second lens group and the third lens group, and varying a distance between the third lens group and the fourth lens group.

With this method, it becomes possible to realize a zoom lens system with a vibration reduction function to have a high zoom ratio and a wide angle of view.

Each numerical example of a zoom lens system according to the first embodiment is explained below with reference to accompanying drawings.

EXAMPLE 1

FIG. 1 is a diagram showing a lens configuration of a zoom lens system according to Example 1 of a first embodiment together with a zooming trajectory of each lens group.

A zoom lens system according to Example 1 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a positive meniscus lens L12 having convex surface facing the object, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a positive meniscus lens L31 having a concave surface facing the object, and a cemented lens constructed by a double convex positive lens L32 cemented with a negative meniscus lens L33 having a concave surface facing the object.

The rear group G32 is composed of a cemented lens constructed by, in order from the object, a double concave negative lens L34 cemented with a double convex positive lens L35. The most object side double concave negative lens L34 in the rear group G32 is an aspherical lens on which an aspherical surface is formed on a resin layer applied on the object side glass surface.

The fourth lens group G4 is composed of, in order from the object, a cemented lens constructed by a negative meniscus lens L41 having a convex surface facing the object cemented with a double convex positive lens L42, and a cemented lens constructed by a positive meniscus lens L43 having a concave surface facing the object cemented with a negative meniscus lens L44 having a concave surface facing the object. The most image side negative meniscus lens L44 is an aspherical lens on which the image side surface is formed by an aspherical surface.

In a zoom lens system according to Example 1, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 1, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 1, an image plane correction, in other words, vibration reduction is carried out by moving only the rear group G32 in the direction substantially perpendicular to the optical axis upon occurring a camera shake.

In a zoom lens system according to Example 1, focusing from infinity to a close object is carried out by moving the second lens group G2 to the object.

Various values associated with a zoom lens system according to Example 1 of the first embodiment are listed in Table 1. In [Specifications], f denotes a focal length of the zoom lens system, FNO denotes an f-number, and 2ω denotes an angle of view (unit: degree).

In [Lens Data], the left most column "N" shows the lens surface number counted in order from the object side, the second column "r" shows a radius of curvature of the lens surface, the third column "d" shows a distance to the next lens surface, the fourth column "νd" shows Abbe number of the material at d-line (wavelength λ=587.6 nm), and the fifth column "nd" shows refractive index of the material at d-line (wavelength λ=587.6 nm). The position of an aspherical surface is expressed by attaching "*" to the right side of the surface number and a paraxial radius of curvature is shown in the second column "r". In the second column "r", r=0.0000 denotes a plane surface. In the third column "d", BF denotes back focal length. In the fifth column "nd", refractive index of the air nd=1.000000 is omitted.

In [Aspherical Data], "E-n" denotes , "$10^{-n}$". In each Example, an aspherical surface is exhibited by the following expression:

$$X = (h^2/r)/\left[1 + [1 - \kappa(h^2/r^2)]^{1/2}\right] + C4 \times h^4 + C6 \times h^6 + C8 \times h^8 + C10 \times h^{10} + C12 \times h^{12} + C14 \times h^{14}$$

where h denotes a vertical height from the optical axis, X denotes a sag amount which is a distance along the optical axis from the tangent surface at the vertex of the aspherical surface to the aspherical surface at the vertical height y from the optical axis, r denotes a radius of curvature of a reference sphere, κ denotes a conical coefficient, and Cn denotes aspherical coefficient of n-th order.

In [Variable Distances], f denotes a focal length, and BF denotes a back focal length.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

In a zoom lens system having a focal length of f, a vibration reduction coefficient, which is a ratio of a moving amount of an image on the image plane to that of the moving lens group perpendicularly to the optical axis upon correcting a camera shake, of K, in order to correct rotational camera shake of an angle of θ, the moving lens group for correcting the camera shake may be moved by the amount of (f·tanθ)/K perpendicularly to the optical axis. The relation is the same in the other examples explained later, so the duplicated explanations are to be omitted.

In the wide-angle end state (W) in Example 1, the vibration reduction coefficient K is 1.102, and the focal length is 16.4 (mm), so that the moving amount of the rear group G32 for correcting a rotational camera shake of 0.80 degrees is 0.208 (mm). In the telephoto end state (T), the vibration reduction coefficient K is 1.800, and the focal length is 83.0 (mm), so that the moving amount of the rear group G32 for correcting a rotational camera shake of 0.35 degrees is 0.282 (mm).

TABLE 1

[Specifications]

|  | W | M | T |
|---|---|---|---|
| f = | 16.4 | 24.2 | 83.0 |
| FNO = | 3.6 | 4.5 | 5.7 |
| 2ω = | 86.7 | 62.4 | 19.9 |

[Lens Data]

| N | r | d | vd | nd |
|---|---|---|---|---|
| 1 | 171.726 | 2.000 | 23.8 | 1.846660 |
| 2 | 58.558 | 6.221 | 49.6 | 1.772499 |
| 3 | 826.359 | 0.100 | | |
| 4 | 46.796 | 4.360 | 46.6 | 1.804000 |
| 5 | 102.445 | (D1) | | |
| 6* | 372.183 | 0.200 | 38.1 | 1.553890 |
| 7 | 93.131 | 1.200 | 42.7 | 1.834807 |
| 8 | 11.766 | 6.314 | | |
| 9 | −27.242 | 1.200 | 42.7 | 1.834807 |
| 10 | 47.860 | 0.490 | | |
| 11 | 34.246 | 3.715 | 23.8 | 1.846660 |
| 12 | −26.693 | 0.635 | | |
| 13 | −19.148 | 1.200 | 37.2 | 1.834000 |
| 14 | −39.779 | (D2) | | |
| 15 | ∞ | 1.000 | | Aperture Stop S |
| 16 | −425.372 | 2.224 | 70.4 | 1.487490 |
| 17 | −19.527 | 0.100 | | |
| 18 | 18.849 | 3.279 | 70.4 | 1.487490 |
| 19 | −22.378 | 1.000 | 40.8 | 1.882997 |
| 20 | −117.992 | 2.500 | | |
| 21* | −28.515 | 0.150 | 38.1 | 1.553890 |
| 22 | −30.597 | 1.000 | 42.7 | 1.834807 |
| 23 | 19.080 | 2.431 | 28.5 | 1.728250 |
| 24 | −100.146 | 2.000 | | |
| 25 | 0.000 | (D3) | | |
| 26 | 32.711 | 4.269 | 23.8 | 1.846660 |
| 27 | 19.344 | 7.251 | 82.5 | 1.497820 |
| 28 | −28.413 | 0.200 | | |
| 29 | −197.723 | 3.007 | 82.5 | 1.497820 |
| 30 | −31.076 | 2.000 | 46.6 | 1.766098 |
| 31* | −54.725 | (BF) | | |

[Aspherical Data]

Surface Number: 6

κ = 17.1808
C4 = 4.07840E−05
C6 = −1.47070E−07
C8 = 1.73490E−10
C10 = 3.50610E−12
C12 = −0.24029E−13
C14 = 0.51556E−16

Surface Number: 21

κ = 2.7193
C4 = 3.17430E−05
C6 = 8.22330E−08
C8 = 0.00000E+00
C10 = 0.00000E+00
C12 = 0.00000E+00
C14 = 0.00000E+00

Surface Number: 31

κ = 6.4334
C4 = 1.65030E−05
C6 = −5.27060E−09
C8 = 5.36500E−10
C10 = −5.29690E−12
C12 = 0.20134E−13
C14 = −0.18195E−16

[Variable Distances]

|  | W | M | T |
|---|---|---|---|
| f | 16.39999 | 24.19997 | 82.99980 |
| D1 | 2.17905 | 9.29038 | 35.23893 |
| D2 | 19.76656 | 12.67294 | 1.20078 |
| D3 | 7.69778 | 4.92538 | 1.00000 |
| BF | 38.57713 | 47.10464 | 73.28825 |

[Values for Conditional Expressions]

(1): f3/fw = 3.107
(2): f3/ft = 0.614
(3): f2/f3 = −0.245
(4): D3W − D3T = 6.69778
(5): f31/ft = 0.297
(6): Bfw/fw = 2.352
(7): f3/f4 = 1.361

Figure 2B:
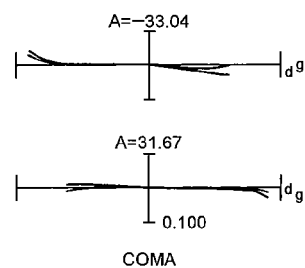

FIGS. 2A and 2B are graphs showing various aberrations and coma upon correcting rotational blur of 0.80°, respectively, of the zoom lens system according to Example 1 of the first embodiment in a 2:5 wide-angle end state focusing on infinity.

Figure 3:
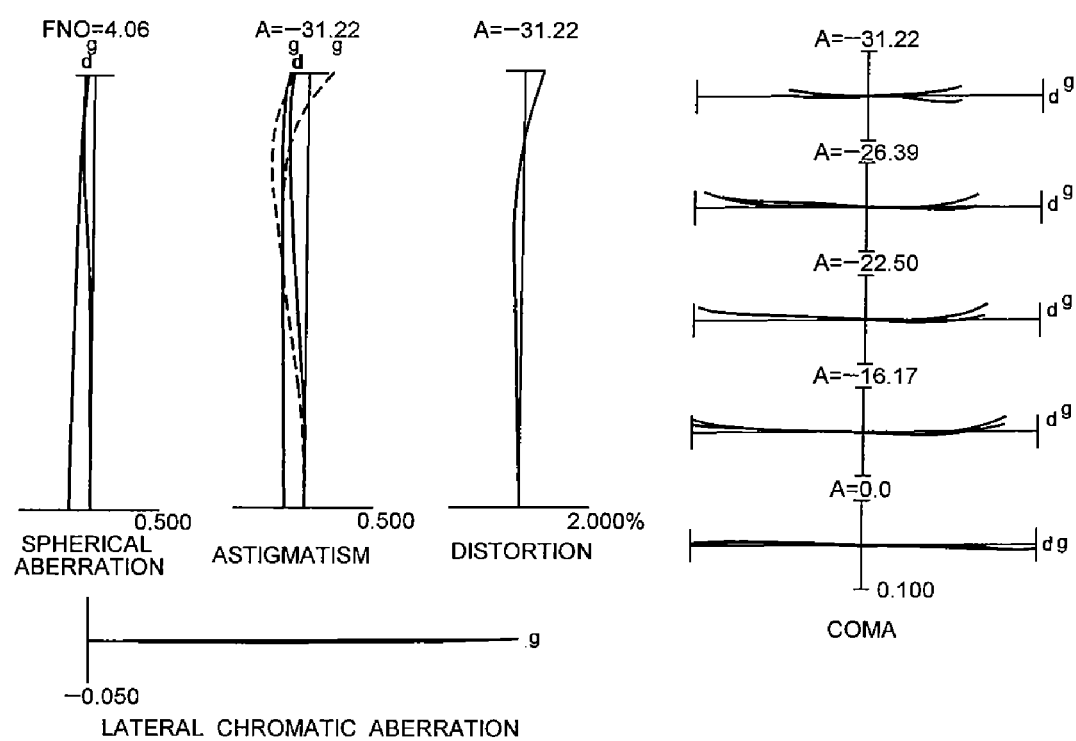
FIG. 3 is a graph showing various aberrations of the zoom lens system according to Example 1 of the first embodiment and the zoom lens system according to Example 6 of a second embodiment in an intermediate focal length state focusing on infinity.

FIG. 3 is a graph showing various aberrations of the zoom lens system according to Example 1 of the first embodiment in an intermediate focal length state focusing on infinity.

Figure 4A:
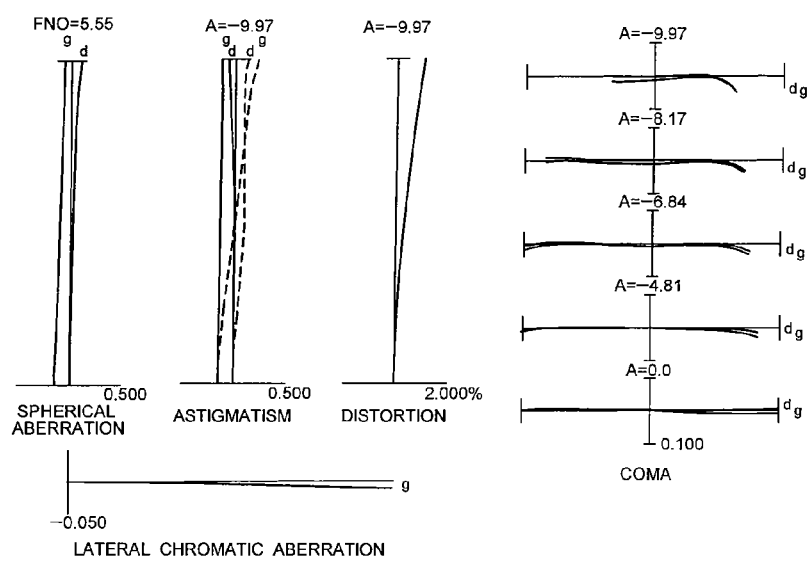
FIGS. 4A and 4B are graphs showing various aberrations and coma upon correcting rotational blur of 0.35°, respectively, of the zoom lens system according to Example 1 of the first embodiment and the zoom lens system according to Example 6 of a second embodiment in a telephoto end state focusing on infinity.
Figure 4B:
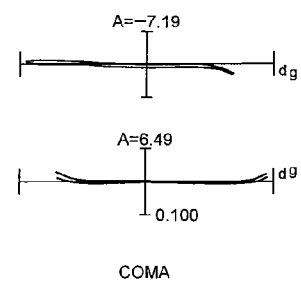

FIGS. 4A and 4B are graphs showing various aberrations and coma upon correcting rotational blur of 0.35°, respectively, of the zoom lens system according to Example 1 of the first embodiment in a telephoto end state focusing on infinity.

In respective graphs, FNO denotes an f-number, A denotes a half angle of view (unit: degree).

In the graphs showing spherical aberration, FNO denotes the f-number with respect to the maximum aperture. In graphs showing astigmatism and distortion, the maximum value of a half angle of view is shown. In graphs showing coma, coma with respect to a half angle of view is shown. In respective graphs, d denotes aberration curve at d-line (wavelength λ=587.6 nm), and g denotes aberration curve at g-line (wavelength λ=435.8 nm). In the graph showing astigmatism, a solid line indicates a sagittal image plane, and a broken line indicates a meridional image plane.

The above-described explanation regarding various aberration graphs is the same as the other examples.

As is apparent from the respective graphs, the zoom lens system according to Example 1 of the first embodiment shows superb optical performance as a result of good corrections to various aberrations in the wide-angle end state, in the intermediate focal length state, and in the telephoto end state.

EXAMPLE 2

FIG. 5 is a diagram showing a lens configuration of a zoom lens system according to Example 2 of a first embodiment together with a zooming trajectory of each lens group.

A zoom lens system according to Example 2 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a positive meniscus lens L12 having convex surface facing the object, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a double convex positive lens L31, and a cemented lens constructed by a double convex positive lens L32 cemented with a double concave negative lens L33.

The rear group G32 is composed of a cemented lens constructed by, in order from the object, a double concave negative lens L34 cemented with a double convex positive lens L35. The most object side double concave negative lens L34 in the rear group G32 is an aspherical lens on which an aspherical surface is formed on a resin layer applied on the object side glass surface.

The fourth lens group G4 is composed of, in order from the object, a double convex positive lens L41, and a cemented lens constructed by a negative meniscus lens L42 having a convex surface facing the object cemented with a double convex positive lens L43, and a negative meniscus lens L44 having a concave surface facing the object. The most image side negative meniscus lens L44 is an aspherical lens on which the image side surface is formed by an aspherical surface.

In a zoom lens system according to Example 2, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 2, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 2, an image plane correction, in other words, vibration reduction is carried out by moving only the rear group G32 in the direction substantially perpendicular to the optical axis upon occurring a camera shake.

In a zoom lens system according to Example 2, focusing from infinity to a close object is carried out by moving the second lens group G2 to the object.

Various values associated with a zoom lens system according to Example 2 of the first embodiment are listed in Table 2.

In the wide-angle end state (W) in Example 2, the vibration reduction coefficient K is 0.880, and the focal length is 16.4 (mm), so that the moving amount of the rear group G32 for correcting a rotational camera shake of 0.80 degrees is 0.260 (mm). In the telephoto end state (T), the vibration reduction coefficient K is 1.500, and the focal length is 83.0 (mm), so that the moving amount of the rear group G32 for correcting a rotational camera shake of 0.35 degrees is 0.338 (mm).

TABLE 2

| [Specifications] | | | |
|---|---|---|---|
| | W | M | T |
| f = | 16.4 | 33.9 | 83.0 |
| FNO = | 3.6 | 4.5 | 5.7 |
| 2ω = | 86.5 | 46.4 | 20.0 |

| [Lens Data] | | | | |
|---|---|---|---|---|
| N | r | d | vd | nd |
| 1 | 186.010 | 2.000 | 23.8 | 1.846660 |
| 2 | 57.108 | 6.824 | 52.3 | 1.754998 |
| 3 | 1445.904 | 0.100 | | |
| 4 | 44.873 | 4.642 | 42.7 | 1.834807 |
| 5 | 94.419 | (D1) | | |
| 6* | 520.086 | 0.150 | 38.1 | 1.553890 |
| 7 | 85.835 | 1.200 | 46.6 | 1.816000 |
| 8 | 11.870 | 6.042 | | |
| 9 | −25.454 | 1.200 | 42.7 | 1.834807 |
| 10 | 55.451 | 0.539 | | |
| 11 | 39.367 | 3.574 | 23.8 | 1.846660 |
| 12 | −27.649 | 0.744 | | |
| 13 | −18.401 | 1.200 | 42.7 | 1.834807 |
| 14 | −34.541 | (D2) | | |
| 15 | ∞ | 1.000 | | Aperture Stop S |

TABLE 2-continued

| | | | | |
|---|---|---|---|---|
| 16 | 32.804 | 2.550 | 52.3 | 1.517420 |
| 17 | −25.691 | 0.200 | | |
| 18 | 33.873 | 2.784 | 82.5 | 1.497820 |
| 19 | −18.357 | 1.000 | 42.7 | 1.834807 |
| 20 | 2477.502 | 2.500 | | |
| 21* | −32.917 | 0.150 | 38.1 | 1.553890 |
| 22 | −33.614 | 1.000 | 42.7 | 1.834807 |
| 23 | 43.144 | 1.625 | 23.8 | 1.846660 |
| 24 | −346.476 | 2.000 | | |
| 25 | 0.000 | (D3) | | |
| 26 | 23.264 | 4.823 | 70.0 | 1.518601 |
| 27 | −78.743 | 0.200 | | |
| 28 | 74.714 | 1.360 | 32.4 | 1.850260 |
| 29 | 22.000 | 6.579 | 82.5 | 1.497820 |
| 30 | −26.508 | 0.412 | | |
| 31 | −34.173 | 1.600 | 46.5 | 1.762260 |
| 32* | −58.732 | (BF) | | |

[Aspherical Data]

Surface Number: 6

$\kappa = -2.1764$
$C4 = 4.70240E-05$
$C6 = -2.04990E-07$
$C8 = 1.13690E-09$
$C10 = -4.83300E-12$
$C12 = 0.10986E-13$
$C14 = 0.00000E+00$ Surface Number: 21

$\kappa = -1.4217$
$C4 = -1.31640E-06$
$C6 = 5.43730E-08$
$C8 = 0.00000E+00$
$C10 = 0.00000E+00$
$C12 = 0.00000E+00$
$C14 = 0.00000E+00$ Surface Number: 32

$\kappa = 5.7116$
$C4 = 3.09920E-05$
$C6 = 2.85680E-08$
$C8 = 9.03240E-10$
$C10 = -7.28720E-12$
$C12 = 0.29235E-13$
$C14 = 0.00000E+00$

[Variable Distances]

| | W | M | T |
|---|---|---|---|
| f | 16.39998 | 33.91908 | 82.99980 |
| D1 | 2.13822 | 16.04163 | 34.70001 |
| D2 | 16.95004 | 7.51901 | 1.20000 |
| D3 | 7.82663 | 3.50000 | 1.00000 |
| BF | 37.99995 | 53.02618 | 70.00001 |

[Values for Conditional Expressions]

(1): f3/fw = 3.849
(2): f3/ft = 0.761
(3): f2/f3 = −0.194
(4): D3W − D3T = 6.82663
(5): f31/ft = 0.362
(6): Bfw/fw = 2.317
(7): f3/f4 = 2.015

Figure 6A:
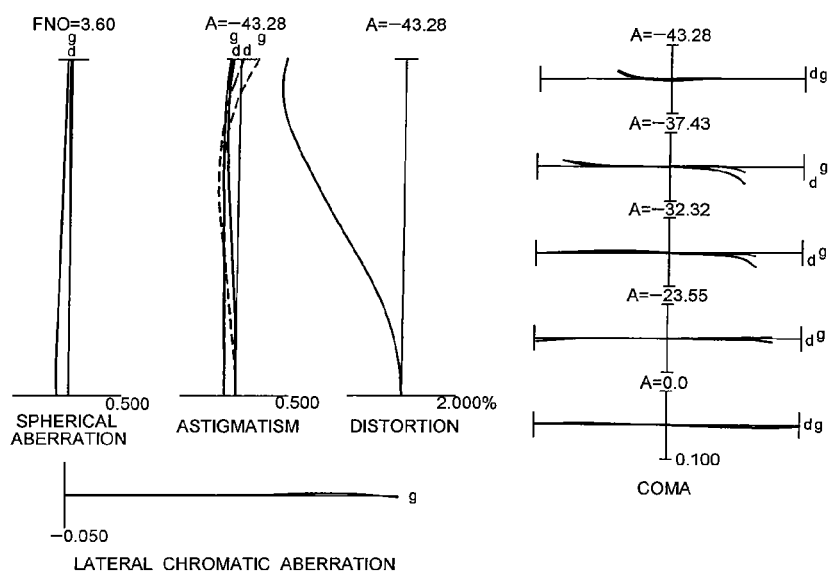
FIGS. 6A and 6B are graphs showing various aberrations and coma upon correcting rotational blur of 0.80°, respectively, of the zoom lens system according to Example 2 of the first embodiment and the zoom lens system according to Example 8 of the second embodiment in a wide-angle end state focusing on infinity.
Figure 6B:
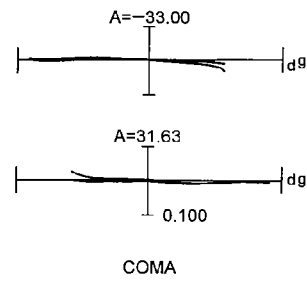

FIGS. 6A and 6B are graphs showing various aberrations and coma upon correcting rotational blur of 0.80°, respectively, of the zoom lens system according to Example 2 of the first embodiment in a wide-angle end state focusing on infinity.

Figure 7:
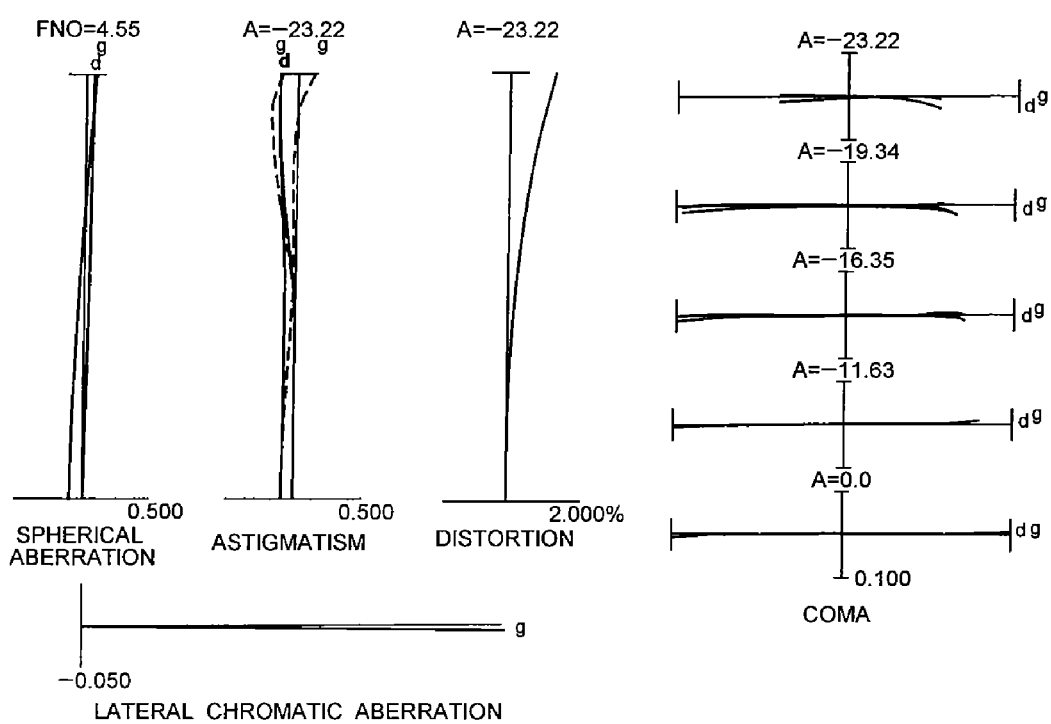
FIG. 7 is a graph showing various aberrations of the zoom lens system according to Example 2 of the first embodiment and the zoom lens system according to Example 8 of the second embodiment in an intermediate focal length state focusing on infinity.

FIG. 7 is a graph showing various aberrations of the zoom lens system according to Example 2 of the first embodiment in an intermediate focal length state focusing on infinity.

Figure 8A:
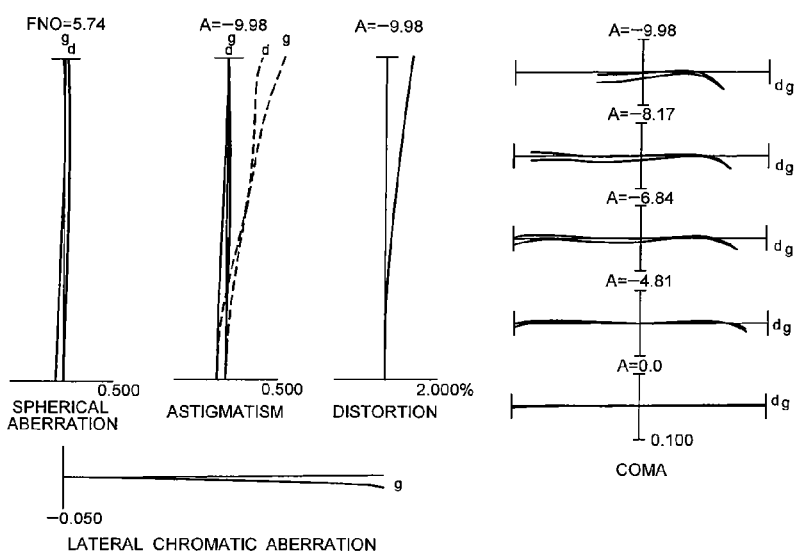
FIGS. 8A and 8B are graphs showing various aberrations and coma upon correcting rotational blur of 0.35°, respectively, of the zoom lens system according to Example 2 of the first embodiment and the zoom lens system according to Example 8 of the second embodiment in a telephoto end state focusing on infinity.
Figure 8B:
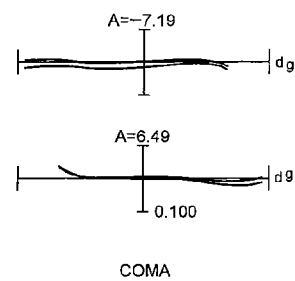

FIGS. 8A and 8B are graphs showing various aberrations and coma upon correcting rotational blur of 0.35°, respectively, of the zoom lens system according to Example 2 of the first embodiment in a telephoto end state focusing on infinity.

As is apparent from the respective graphs, the zoom lens system according to Example 2 of the first embodiment shows superb optical performance as a result of good corrections to various aberrations in the wide-angle end state, in the intermediate focal length state, and in the telephoto end state.

EXAMPLE 3

FIG. 9 is a diagram showing a lens configuration of a zoom lens system according to Example 3 of a first embodiment together with a zooming trajectory of each lens group.

A zoom lens system according to Example 3 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a positive meniscus lens L12 having convex surface facing the object, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a double convex positive lens L31, and a cemented lens constructed by a double convex positive lens L32 cemented with a negative meniscus lens L33 having a concave surface facing the object.

The rear group G32 is composed of a cemented lens constructed by, in order from the object, a double concave negative lens L34 cemented with a positive meniscus lens L35 having a convex surface facing the object. The most object side double concave negative lens L34 in the rear group G32 is an aspherical lens on which an aspherical surface is formed on a resin layer applied on the object side glass surface.

The fourth lens group G4 is composed of, in order from the object, a positive meniscus lens L41 having a concave surface facing the object, and a cemented lens constructed by a double convex positive lens L42 cemented with a double concave negative lens L43, and a negative meniscus lens L44 having a concave surface facing the object. The most object side positive meniscus lens L41 is an aspherical lens on which the object side surface is formed by an aspherical surface.

In a zoom lens system according to Example 3, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 3, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 3, an image plane correction, in other words, vibration reduction is carried out by moving only the rear group G32 in the direction substantially perpendicular to the optical axis upon occurring a camera shake.

In a zoom lens system according to Example 3, focusing from infinity to a close object is carried out by moving the second lens group G2 to the object.

Various values associated with a zoom lens system according to Example 3 of the first embodiment are listed in Table 3.

In the wide-angle end state (W) in Example 3, the vibration reduction coefficient K is 1.104, and the focal length is 16.4 (mm), so that the moving amount of the rear group G32 for correcting a rotational camera shake of 0.80 degrees is 0.207 (mm). In the telephoto end state (T), the vibration reduction coefficient K is 1.819, and the focal length is 83.0 (mm), so that the moving amount of the rear group G32 for correcting a rotational camera shake of 0.35 degrees is 0.279 (mm).

TABLE 3

[Specifications]

| | W | M | T |
|---|---|---|---|
| f = | 16.4 | 34.1 | 83.0 |
| FNO = | 3.6 | 4.4 | 5.4 |
| 2ω = | 87.5 | 47.0 | 20.3 |

[Lens Data]

| N | r | d | vd | nd |
|---|---|---|---|---|
| 1 | 269.486 | 2.000 | 23.8 | 1.846660 |
| 2 | 67.239 | 7.217 | 49.6 | 1.772499 |
| 3 | 22008.798 | 0.100 | | |
| 4 | 49.607 | 4.504 | 42.7 | 1.834807 |
| 5 | 105.112 | (D1) | | |
| 6* | 262.081 | 0.150 | 38.1 | 1.553890 |
| 7 | 95.557 | 1.200 | 46.6 | 1.816000 |
| 8 | 12.537 | 7.088 | | |
| 9 | −31.137 | 1.200 | 46.6 | 1.804000 |
| 10 | 56.257 | 0.100 | | |
| 11 | 36.553 | 3.806 | 23.8 | 1.846660 |
| 12 | −40.735 | 0.704 | | |
| 13 | −25.479 | 1.200 | 42.7 | 1.834807 |
| 14 | −45.309 | (D2) | | |
| 15 | ∞ | 1.000 | | Aperture Stop S |
| 16 | 29.426 | 2.685 | 70.4 | 1.487490 |
| 17 | −26.404 | 0.200 | | |
| 18 | 25.849 | 2.916 | 82.5 | 1.497820 |
| 19 | −21.717 | 1.000 | 42.7 | 1.834807 |
| 20 | −2212.439 | 2.500 | | |
| 21* | −36.151 | 0.100 | 38.1 | 1.553890 |
| 22 | −34.195 | 1.000 | 46.6 | 1.816000 |
| 23 | 21.952 | 1.776 | 25.4 | 1.805181 |
| 24 | 171.806 | 2.000 | | |
| 25 | 0.000 | (D3) | | |
| 26* | −261.293 | 2.565 | 61.1 | 1.589130 |
| 27 | −31.706 | 0.200 | | |
| 28 | 39.431 | 2.991 | 82.5 | 1.497820 |
| 29 | −123.144 | 1.248 | 23.8 | 1.846660 |
| 30 | 48.841 | 2.165 | | |
| 31 | −69.810 | 3.425 | 65.4 | 1.603001 |
| 32 | −21.259 | (BF) | | |

TABLE 3-continued

[Aspherical Data]

Surface Number: 6

κ = 1.0000
C4 = 2.75610E−05
C6 = −7.17460E−08
C8 = 1.32080E−10
C10 = −1.28130E−13
C12 = 0.00000E+00
C14 = 0.00000E+00

Surface Number: 21

κ = 1.5000
C4 = 1.52920E−05
C6 = 3.43650E−08
C8 = 0.00000E+00
C10 = 0.00000E+00
C12 = 0.00000E+00
C14 = 0.00000E+00

Surface Number: 26

κ = 9.9454
C4 = −3.28720E−05
C6 = −1.08450E−08
C8 = 0.00000E+00
C10 = 0.00000E+00
C12 = 0.00000E+00
C14 = 0.00000E+00

[Variable Distances]

| | W | M | T |
|---|---|---|---|
| f | 16.39999 | 34.08159 | 82.99972 |
| D1 | 2.44878 | 18.51037 | 38.25669 |
| D2 | 22.79625 | 9.81033 | 1.20000 |
| D3 | 7.40495 | 3.42335 | 1.19328 |
| BF | 37.99996 | 53.00295 | 71.99994 |

[Values for Conditional Expressions]

(1): f3/fw = 3.143
(2): f3/ft = 0.621
(3): f2/f3 = −0.270
(4): D3W − D3T = 6.21167
(5): f31/ft = 0.301
(6): Bfw/fw = 2.317
(7): f3/f4 = 1.442

Figure 10A:
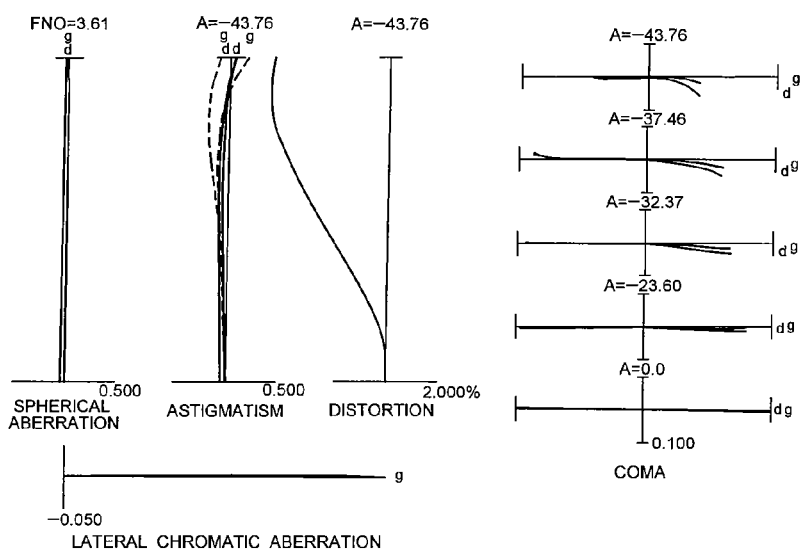
FIGS. 10A and 10B are graphs showing various aberrations and coma upon correcting rotational blur of 0.80°, respectively, of the zoom lens system according to Example 3 of the first embodiment and the zoom lens system according to Example 9 of the second embodiment in a wide-angle end state focusing on infinity.
Figure 10B:
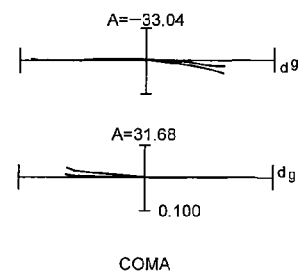

FIGS. 10A and 10B are graphs showing various aberrations and coma upon correcting rotational blur of 0.80°, respectively, of the zoom lens system according to Example 3 of the first embodiment in a wide-angle end state focusing on infinity.

Figure 11:
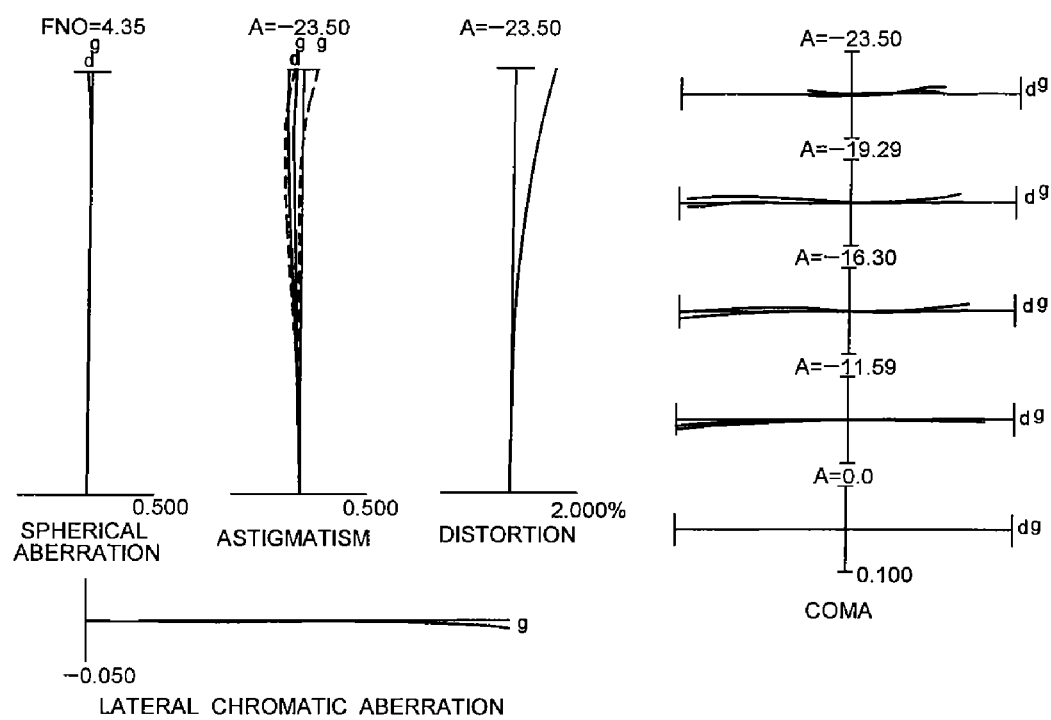
FIG. 11 is a graph showing various aberrations of the zoom lens system according to Example 3 of the first embodiment and the zoom lens system according to Example 9 of the second embodiment in an intermediate focal length state focusing on infinity.

FIG. 11 is a graph showing various aberrations of the zoom lens system according to Example 3 of the first embodiment in an intermediate focal length state focusing on infinity.

Figure 12A:
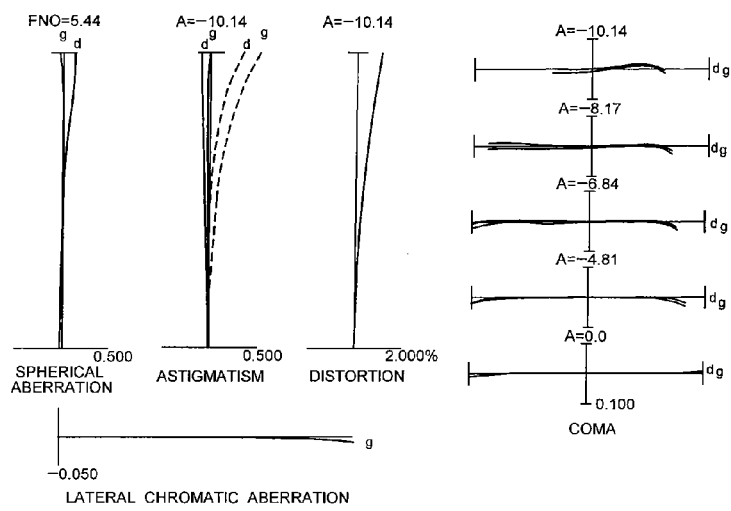
FIGS. 12A and 12B are graphs showing various aberrations and coma upon correcting rotational blur of 0.35°, respectively, of the zoom lens system according to Example 3 of the first embodiment and the zoom lens system according to Example 9 of the second embodiment in a telephoto end state focusing on infinity.
Figure 12B:
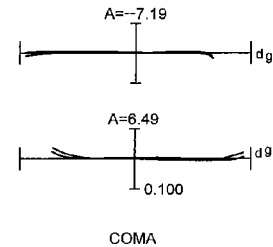

FIGS. 12A and 12B are graphs showing various aberrations and coma upon correcting rotational blur of 0.35°, respectively, of the zoom lens system according to Example 3 of the first embodiment in a telephoto end state focusing on infinity.

As is apparent from the respective graphs, the zoom lens system according to Example 3 of the first embodiment shows superb optical performance as a result of good corrections to various aberrations in the wide-angle end state, in the intermediate focal length state, and in the telephoto end state.

EXAMPLE 4

Figure 13:
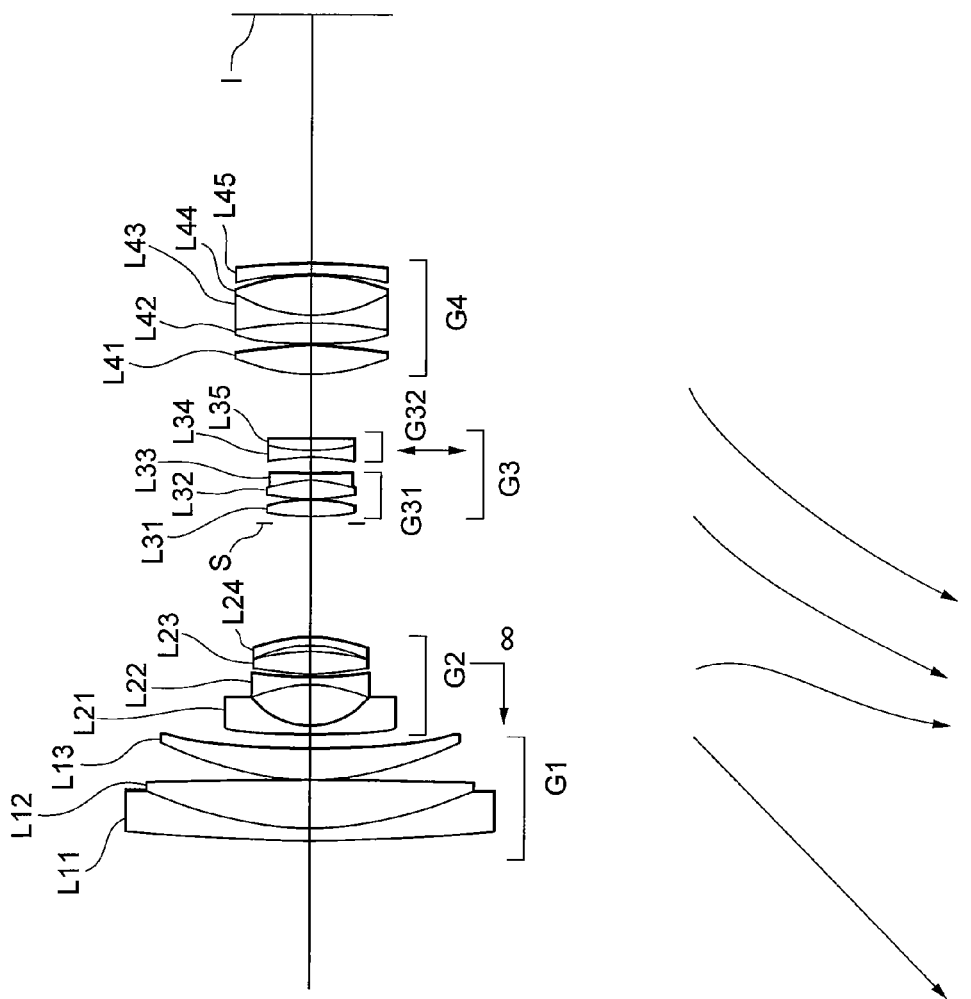
FIG. 13 is a diagram showing a lens configuration of a zoom lens system according to Example 4 of the first embodiment and a zoom lens system according to Example 10 of the second embodiment together with a zooming trajectory of each lens group.

FIG. 13 is a diagram showing a lens configuration of a zoom lens system according to Example 4 of a first embodiment together with a zooming trajectory of each lens group.

A zoom lens system according to Example 4 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a double convex positive meniscus lens L12, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a double convex positive lens L31, and a cemented lens constructed by a double convex positive lens L32 cemented with a double concave negative lens L33.

The rear group G32 is composed of a cemented lens constructed by, in order from the object, a double concave negative lens L34 cemented with a double convex positive lens L35. The most object side double concave negative lens L34 in the rear group G32 is an aspherical lens on which an aspherical surface is formed on a resin layer applied on the object side glass surface.

The fourth lens group G4 is composed of, in order from the object, a double convex positive lens L41, and a cemented lens constructed by a double convex positive lens L42 cemented with a double concave negative lens L43 cemented with a double convex positive lens L44, and a negative meniscus lens L45 having a concave surface facing the object. The most image side negative meniscus lens L45 is an aspherical lens on which the image side surface is formed by an aspherical surface.

In a zoom lens system according to Example 4, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 4, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 4, an image plane correction, in other words, vibration reduction is carried out by moving only the rear group G32 in the direction substantially perpendicular to the optical axis upon occurring a camera shake.

In a zoom lens system according to Example 4, focusing from infinity to a close object is carried out by moving the second lens group G2 to the object.

Various values associated with a zoom lens system according to Example 4 of the first embodiment are listed in Table 4.

In the wide-angle end state (W) in Example 4, the vibration reduction coefficient K is 0.951, and the focal length is 16.4 (mm), so that the moving amount of the rear group G32 for correcting a rotational camera shake of 0.80 degrees is 0.241 (mm). In the telephoto end state (T), the vibration reduction coefficient K is 1.628, and the focal length is 83.0 (mm), so that the moving amount of the rear group G32 for correcting a rotational camera shake of 0.35 degrees is 0.311 (mm).

TABLE 4

[Specifications]

| | W | M | T |
|---|---|---|---|
| f = | 16.4 | 34.3 | 83.0 |
| FNO = | 3.6 | 4.6 | 5.8 |
| 2ω = | 86.6 | 45.7 | 19.9 |

[Lens Data]

| N | r | d | vd | nd |
|---|---|---|---|---|
| 1 | 236.486 | 2.000 | 25.4 | 1.805181 |
| 2 | 55.828 | 7.245 | 54.7 | 1.729157 |
| 3 | −4442.864 | 0.100 | | |
| 4 | 45.771 | 4.666 | 42.7 | 1.834807 |
| 5 | 100.227 | (D1) | | |
| 6* | 493.016 | 0.150 | 38.1 | 1.553890 |
| 7 | 91.115 | 1.200 | 46.6 | 1.816000 |
| 8 | 11.518 | 6.160 | | |
| 9 | −23.691 | 1.200 | 42.7 | 1.834807 |
| 10 | 59.483 | 0.486 | | |
| 11 | 39.039 | 3.453 | 23.8 | 1.846660 |
| 12 | −31.030 | 0.886 | | |
| 13 | −18.463 | 1.200 | 42.7 | 1.834807 |
| 14 | −26.625 | (D2) | | |
| 15 | ∞ | 1.000 | | Aperture Stop S |
| 16 | 37.010 | 2.530 | 52.3 | 1.517420 |
| 17 | −24.424 | 0.200 | | |
| 18 | 28.678 | 2.847 | 70.4 | 1.487490 |
| 19 | −19.296 | 1.000 | 37.2 | 1.834000 |
| 20 | 194.798 | 2.500 | | |
| 21* | −31.892 | 0.150 | 38.1 | 1.553890 |
| 22 | −30.944 | 1.000 | 42.7 | 1.834807 |
| 23 | 31.645 | 1.769 | 23.8 | 1.846660 |
| 24 | −421.375 | 2.000 | | |
| 25 | 0.000 | (D3) | | |
| 26 | 28.174 | 4.285 | 65.4 | 1.603001 |
| 27 | −59.955 | 0.200 | | |
| 28 | 47.345 | 3.338 | 82.5 | 1.497820 |
| 29 | −64.036 | 1.200 | 37.2 | 1.834000 |
| 30 | 22.188 | 6.055 | 70.4 | 1.487490 |
| 31 | −32.448 | 0.200 | | |
| 32 | −55.522 | 1.600 | 46.5 | 1.762260 |
| 33* | −65.799 | (BF) | | |

[Aspherical Data]

Surface Number: 6

κ = −11.6613
C4 = 4.52620E−05
C6 = −1.64780E−07
C8 = 4.37200E−10
C10 = −3.49590E−13
C12 = 0.00000E+00
C14 = 0.00000E+00

Surface Number: 21

κ = 0.3985
C4 = 5.29000E−06
C6 = 4.67710E−08
C8 = 0.00000E−00
C10 = 0.00000E+00
C12 = 0.00000E+00
C14 = 0.00000E+00

TABLE 4-continued

Surface Number: 33

κ = −20.0000
C4 = 1.25500E−05
C6 = 8.20270E−08
C8 = −1.76920E−10
C10 = 1.06530E−12
C12 = 0.00000E+00
C14 = 0.00000E+00

[Variable Distances]

|    | W        | M        | T        |
|----|----------|----------|----------|
| f  | 16.39997 | 34.34251 | 82.99967 |
| D1 | 2.23196  | 15.92685 | 35.22672 |
| D2 | 17.65951 | 7.65683  | 1.20000  |
| D3 | 7.90062  | 3.27101  | 1.00000  |
| BF | 37.99989 | 53.81300 | 69.99968 |

[Values for Conditional Expressions]

(1): f3/fw = 4.609
(2): f3/ft = 0.911
(3): f2/f3 = −0.170
(4): D3W − D3T = 6.90062
(5): f31/ft = 0.378
(6): Bfw/fw = 2.317
(7): f3/f4 = 2.462

Figure 14A:
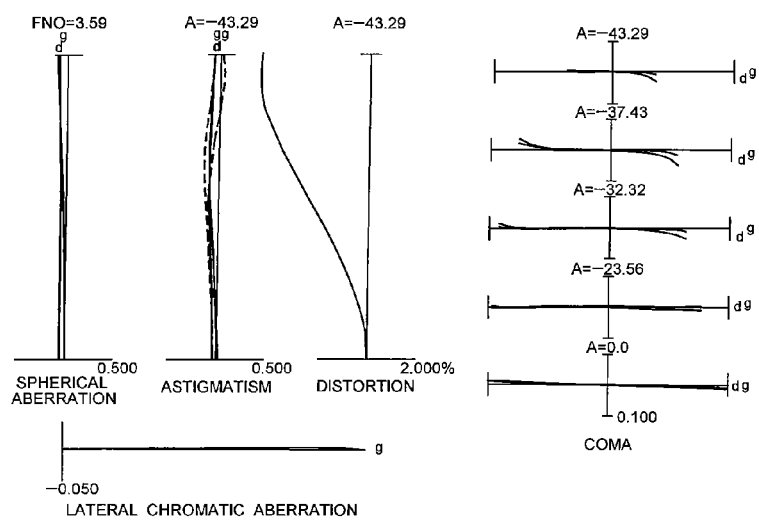
FIGS. 14A and 14B are graphs showing various aberrations and coma upon correcting rotational blur of 0.80°, respectively, of the zoom lens system according to Example 4 of the first embodiment and the zoom lens system according to Example 10 of the second embodiment in a wide-angle end state focusing on infinity.
Figure 14B:
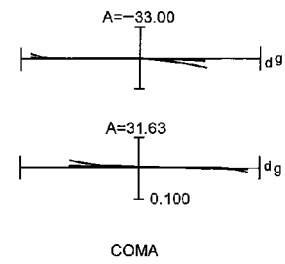

FIGS. 14A and 14B are graphs showing various aberrations and coma upon correcting rotational blur of 0.80°, respectively, of the zoom lens system according to Example 4 of the first embodiment in a wide-angle end state focusing on infinity.

Figure 15:
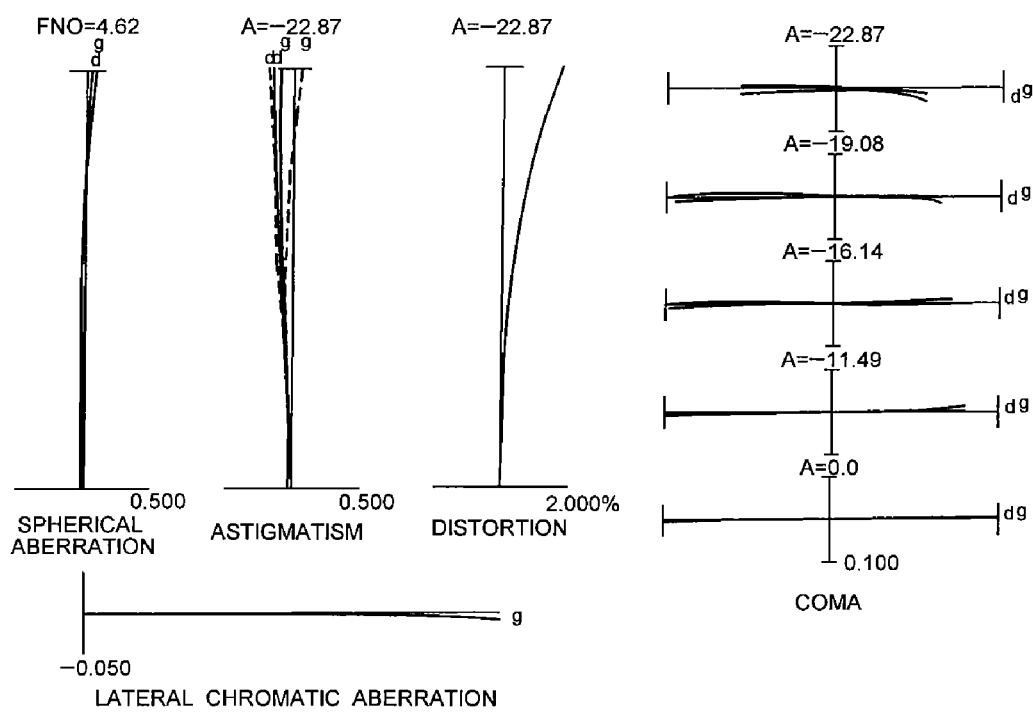
FIG. 15 is a graph showing various aberrations of the zoom lens system according to Example 4 of the first embodiment and the zoom lens system according to Example 10 of the second embodiment in an intermediate focal length state focusing on infinity.

FIG. 15 is a graph showing various aberrations of the zoom lens system according to Example 4 of the first embodiment in an intermediate focal length state focusing on infinity.

Figure 16A:
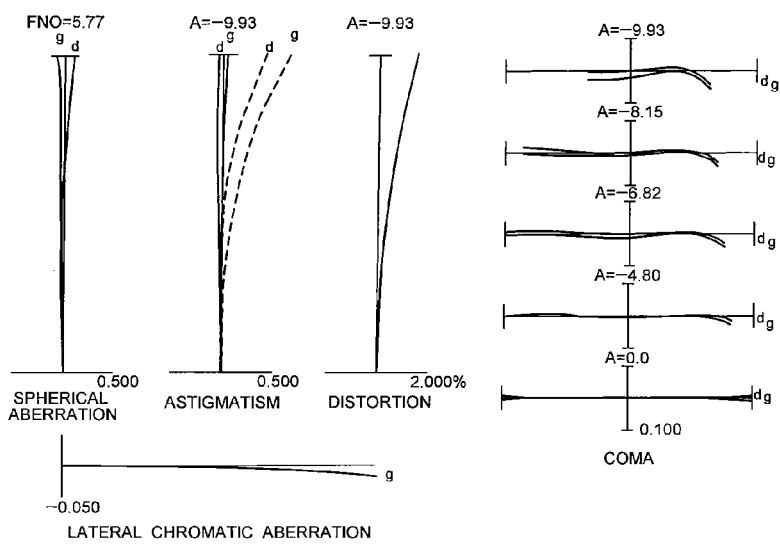
FIGS. 16A and 16B are graphs showing various aberrations and coma upon correcting rotational blur of 0.35°, respectively, of the zoom lens system according to Example 4 of the first embodiment and the zoom lens system according to Example 10 of the second embodiment in a telephoto end state focusing on infinity.
Figure 16B:
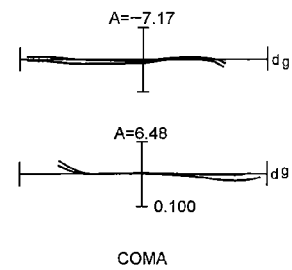

FIGS. 16A and 16B are graphs showing various aberrations and coma upon correcting rotational blur of 0.35°, respectively, of the zoom lens system according to Example 4 of the first embodiment in a telephoto end state focusing on infinity.

As is apparent from the respective graphs, the zoom lens system according to Example 4 of the first embodiment shows superb optical performance as a result of good corrections to various aberrations in the wide-angle end state, in the intermediate focal length state, and in the telephoto end state.

EXAMPLE 5

FIG. 17 is a diagram showing a lens configuration of a zoom lens system according to Example 5 of a first embodiment together with a zooming trajectory of each lens group.

A zoom lens system according to Example 5 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a double convex positive lens L12, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a cemented lens constructed by a negative meniscus lens L31 having a convex surface facing the object cemented with a double convex positive lens L32, and a double convex positive lens L33.

The rear group G32 is composed of a cemented lens constructed by, in order from the object, a double concave negative lens L34 cemented with a positive meniscus lens L35 having a convex surface facing the object. The most object side double concave negative lens L34 in the rear group G32 is an aspherical lens on which an aspherical surface is formed on a resin layer applied on the object side glass surface.

The fourth lens group G4 is composed of, in order from the object, a double convex positive lens L41, and a cemented lens constructed by a double convex positive lens L42 cemented with a double concave negative lens L43, and a positive meniscus lens L44 having a concave surface facing the object. The most object side double convex positive lens L41 is an aspherical lens on which the image side surface is formed by an aspherical surface.

In a zoom lens system according to Example 5, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 5, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 5, an image plane correction, in other words, vibration reduction is carried out by moving only the rear group G32 in the direction substantially perpendicular to the optical axis upon occurring a camera shake.

In a zoom lens system according to Example 5, focusing from infinity to a close object is carried out by moving the second lens group G2 to the object.

Various values associated with a zoom lens system according to Example 5 of the first embodiment are listed in Table 5.

In the wide-angle end state (W) in Example 3, the vibration reduction coefficient K is 1.723, and the focal length is 16.4 (mm), so that the moving amount of the rear group G32 for correcting a rotational camera shake of 0.80 degrees is 0.133 (mm). In the telephoto end state (T), the vibration reduction coefficient K is 2.725, and the focal length is 78.0 (mm), so that the moving amount of the rear group G32 for correcting a rotational camera shake of 0.35 degrees is 0.175 (mm).

TABLE 5

[Specifications]

| | W | M | T |
|---|---|---|---|
| f = | 16.4 | 33.7 | 78.0 |
| FNO = | 3.6 | 4.5 | 5.7 |
| 2ω = | 87.0 | 46.9 | 21.3 |

[Lens Data]

| N | r | d | vd | nd |
|---|---|---|---|---|
| 1 | 406.982 | 2.000 | 23.8 | 1.846660 |
| 2 | 73.318 | 7.000 | 49.6 | 1.772500 |
| 3 | −1070.277 | 0.100 | | |
| 4 | 50.015 | 4.400 | 42.7 | 1.834810 |
| 5 | 107.753 | (D1) | | |
| 6* | 174.688 | 0.150 | 38.1 | 1.553890 |
| 7 | 75.000 | 1.200 | 46.6 | 1.816000 |
| 8 | 12.343 | 7.200 | | |
| 9 | −31.585 | 1.000 | 46.6 | 1.816000 |
| 10 | 146.318 | 0.100 | | |
| 11 | 39.949 | 4.000 | 23.8 | 1.846660 |
| 12 | −39.949 | 0.800 | | |
| 13 | −25.000 | 1.000 | 42.7 | 1.834810 |
| 14 | −63.093 | (D2) | | |
| 15 | ∞ | 0.500 | | Aperture Stop S |
| 16 | 36.523 | 1.000 | 46.6 | 1.804000 |
| 17 | 14.071 | 3.200 | 81.6 | 1.497000 |
| 18 | −36.295 | 0.100 | | |
| 19 | 21.699 | 2.800 | 81.6 | 1.497000 |
| 20 | −30.106 | 3.000 | | |
| 21* | −23.784 | 0.100 | 38.1 | 1.553890 |
| 22 | −23.784 | 1.000 | 46.6 | 1.816000 |
| 23 | 15.480 | 1.800 | 25.4 | 1.805180 |
| 24 | 90.957 | 2.600 | | |
| 25 | 0.000 | (D3) | | |
| 26 | 50.288 | 3.200 | 64.1 | 1.516800 |
| 27 | −60.000 | 0.100 | 38.1 | 1.553890 |
| 28* | −50.288 | 2.000 | | |
| 29 | 2757.601 | 3.200 | 42.7 | 1.834810 |
| 30 | −40.659 | 1.200 | 23.8 | 1.846660 |
| 31 | 46.525 | 1.600 | | |
| 32 | −549.545 | 3.800 | 54.7 | 1.729160 |
| 33 | −25.439 | (BF) | | |

[Aspherical Data]

Surface Number: 6

κ = 1.0000
C4 = 2.94640E−05
C6 = −9.51900E−08
C8 = 2.40590E−10
C10 = −2.91650E−13
C12 = 0.00000E+00
C14 = 0.00000E+00

Surface Number: 21

κ = 1.0000
C4 = 3.67010E−05
C6 = 1.21640E−07
C8 = 0.00000E+00
C10 = 0.00000E+00
C12 = 0.00000E+00
C14 = 0.00000E+00

Surface Number: 28

κ = 1.0000
C4 = 2.72480E−05
C6 = −1.33750E−08
C8 = 0.00000E+00
C10 = 0.00000E+00
C12 = 0.00000E+00
C14 = 0.00000E+00

TABLE 5-continued

[Variable Distances]

| | W | M | T |
|---|---|---|---|
| f | 16.40160 | 33.69972 | 77.98505 |
| D1 | 2.40000 | 18.20000 | 38.20000 |
| D2 | 22.30000 | 9.30000 | 1.20000 |
| D3 | 7.70000 | 3.10000 | 1.00000 |
| BF | 37.99980 | 53.07409 | 70.00006 |

[Values for Conditional Expressions]

(1): f3/fw = 3.267
(2): f3/ft = 0.687
(3): f2/f3 = −0.263
(4): D3W − D3T = 6.70000
(5): f31/ft = 0.248
(6): Bfw/fw = 2.317
(7): f3/f4 = 1.510

Figure 18A:
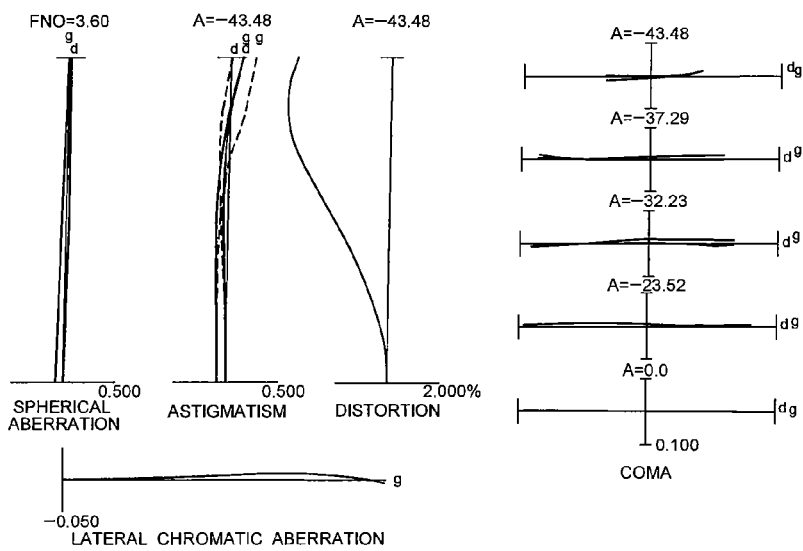
FIGS. 18A and 18B are graphs showing various aberrations and coma upon correcting rotational blur of 0.80°, respectively, of the zoom lens system according to Example 5 of the first embodiment and the zoom lens system according to Example 11 of the second embodiment in a wide-angle end state focusing on infinity.
Figure 18B:
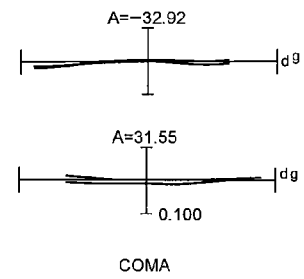

FIGS. 18A and 18B are graphs showing various aberrations and coma upon correcting rotational blur of 0.80°, respectively, of the zoom lens system according to Example 5 of the first embodiment in a wide-angle end state focusing on infinity.

Figure 19:
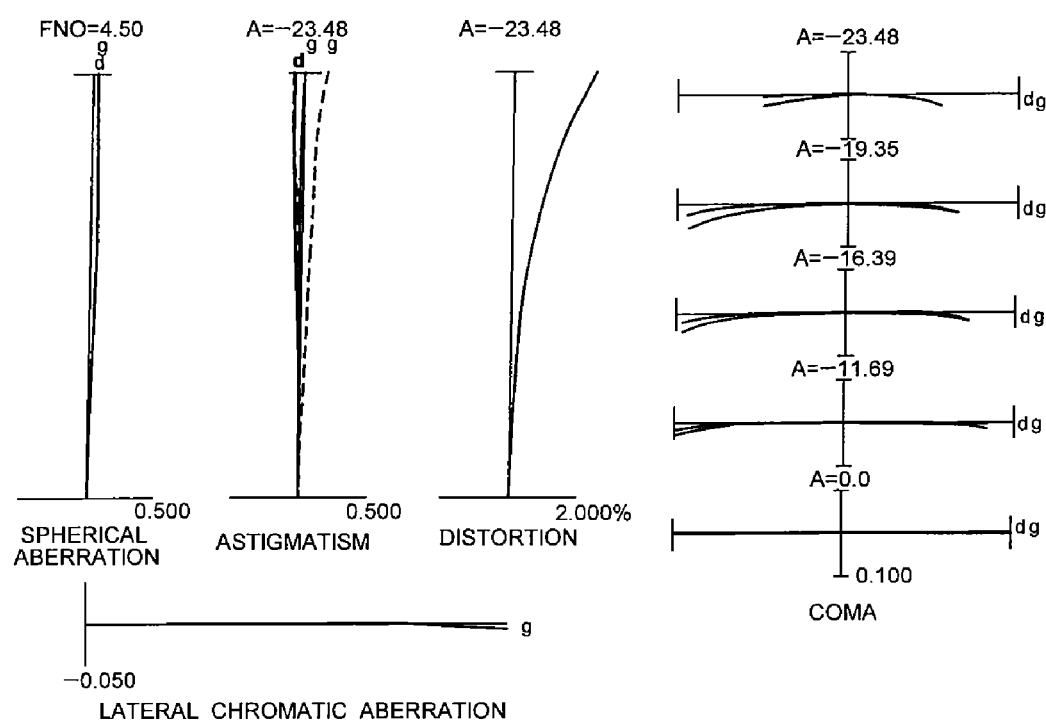
FIG. 19 is a graph showing various aberrations of the zoom lens system according to Example 5 of the first embodiment and the zoom lens system according to Example 11 of the second embodiment in an intermediate focal length state focusing on infinity.

FIG. 19 is a graph showing various aberrations of the zoom lens system according to Example 5 of the first embodiment in an intermediate focal length state focusing on infinity.

Figure 20A:
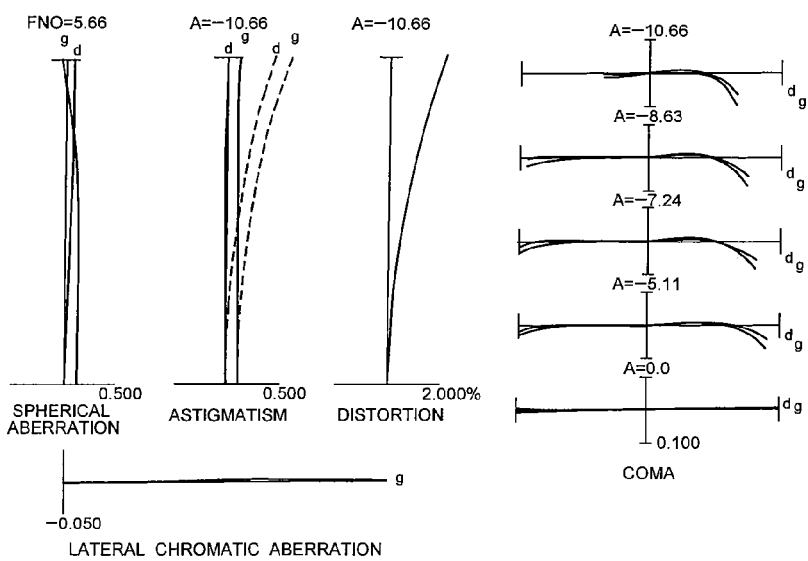
FIGS. 20A and 20B are graphs showing various aberrations and coma upon correcting rotational blur of 0.35°, respectively, of the zoom lens system according to Example 5 of the first embodiment and the zoom lens system according to Example 11 of the second embodiment in a telephoto end state focusing on infinity.
Figure 20B:
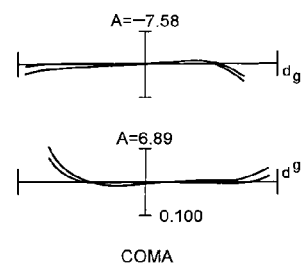

FIGS. 20A and 20B are graphs showing various aberrations and coma upon correcting rotational blur of 0.35°, respectively, of the zoom lens system according to Example 5 of the first embodiment in a telephoto end state focusing on infinity.

As is apparent from the respective graphs, the zoom lens system according to Example 5 of the first embodiment shows superb optical performance as a result of good corrections to various aberrations in the wide-angle end state, in the intermediate focal length state, and in the telephoto end state.

Second Embodiment

A zoom lens system, an imaging apparatus, a method for vibration reduction, and a method for varying a focal length according to a second embodiment are explained below.

A zoom lens system according to the second embodiment includes, in order from an object, a first lens group having positive refractive power, a second lens group having negative refractive power, a fourth lens group having positive refractive power. Upon zooming from a wide-angle end state to a telephoto end state, a distance between the first lens group and the second lens group increases, a distance between the second lens group and the third lens group decreases, and a distance between the third lens group and the fourth lens group varies. The third lens group includes, in order from the object, a front group having positive refractive power, and a rear group having negative refractive power. Vibration reduction upon occurring a camera shake is carried out by moving only the rear group in a direction substantially perpendicular to the optical axis. The following conditional expression (3) is satisfied:

$$-0.275 < f2/f3 < -0.100 \tag{3}$$

where f2 denotes a focal length of the second lens group, and f3 denotes the focal length of the third lens group.

Since the third lens group can be made smaller in the diameter than the other lens groups, the third lens group is suitable for being equipped with a vibration reduction mechanism. With consisting the third lens group of the front group having positive refractive power and the rear group having negative refractive power, and with using only the rear group as a vibration reduction lens group, the vibration reduction mechanism can be compact, and the weight of the vibration reduction lens group can be reduced. Moreover, lens power distribution of the third lens group can be properly arranged. Accordingly, when vibration reduction is carried out by moving the rear group in a direction substantially perpendicular to the optical axis upon occurring a camera shake, deterioration of optical performance can be made small.

Conditional expression (3) defines an appropriate range of the focal length of the second lens group with respect to the focal length of the third lens group. With satisfying conditional expression (3) it becomes possible to preferably correct various aberrations such as spherical aberration, astigmatism, curvature of field, and coma, in particular astigmatism, curvature of field, coma in the wide-angle end state, and spherical aberration in the telephoto end state, and it becomes possible to suppress variation in curvature of field upon vibration reduction, so that high optical performance can be obtained. Moreover, by making refractive power of the second lens group strong to prevent off-axis bundle of rays passing through the first lens group from separating away from the optical axis, it becomes possible to preferably correct spherical aberration and coma, so that high optical performance can be obtained. Moreover, since the diameter of the first lens group can be small, it becomes possible to make the zoom lens system compact. Furthermore, by making refractive power of the third lens group weak with maintaining refractive power of the second lens group, without increasing the number of lenses in the front or rear group, it becomes possible to preferably correct various aberrations such as spherical aberration and coma, and to suppress deterioration in optical performance such as variation in coma and curvature of field upon vibration reduction. As a result, the vibration reduction mechanism can be small, and since the maximum diameter of the lens barrel can be small, the total lens length and the whole system can be compact.

When the ratio f2/f3 is equal to or falls below the lower limit of conditional expression (3), refractive power of the second lens group becomes weak, so that off-axis bundle of rays passing through the first lens group separate from the optical axis. Accordingly, it becomes difficult to preferably correct spherical aberration and coma, in particular, coma in the wide-angle end state. Moreover, since the diameter of the first lens group becomes large, it becomes difficult to make the zoom lens system compact, so that it is undesirable. Furthermore, since refractive power of the third lens group becomes strong with keeping refractive power of the second lens group, it becomes difficult to preferably correct spherical aberration in the telephoto end state and variation in curvature of field upon vibration reduction. Furthermore, since the number of lenses in the front group or the rear group becomes large, the total lens length becomes large and the whole system becomes bulky, so that it is undesirable. In particular, increasing the number of lenses in the rear group makes the vibration reduction mechanism large, and makes the maximum diameter of the lens barrel large, so that it is undesirable.

On the other hand, when the ratio f2/f3 is equal to or exceeds the upper limit of conditional expression (3), refractive power of the second lens group becomes too strong, and deterioration of astigmatism and curvature of field becomes conspicuous, so that it is undesirable. In order to secure the effect of the present invention, it is preferable to set the upper limit of conditional expression (3) to −0.15.

In a zoom lens system according to the second embodiment, the following conditional expression (8) is preferably satisfied:

$$1.96 < f3/f31 < 5.00 \quad (8)$$

where f3 denotes a focal length of the third lens group, and f31 denotes a focal length of the front lens group.

Conditional expression (8) defines an appropriate range of the focal length of the third lens group with respect to the focal length of the front group. With satisfying conditional expression (8), it becomes possible to preferably correct spherical aberration and chromatic aberration in the telephoto end state. Moreover, it becomes possible to suppress deterioration in optical performance caused by various aberrations such as coma result from decentering generated by a manufacturing error, so that preferable optical performance can be obtained.

When the ration f3/f31 is equal to or falls below the lower limit of conditional expression (8), refractive power of the third lens group becomes strong, so that it becomes difficult to correct spherical aberration and chromatic aberration in the telephoto end state. In order to secure the effect of the present invention, it is preferable to set the lower limit of conditional expression (8) to 2.00.

On the other hand, when the ration f3/f31 is equal to or exceeds the upper limit of conditional expression (8), refractive power of the fourth lens group becomes strong, so that deterioration in optical performance caused by various aberrations such as coma result from decentering generated by a manufacturing error becomes conspicuous. In order to secure the effect of the present invention, it is preferable to set the upper limit of conditional expression (8) to 4.00.

In a zoom lens system according to the second embodiment, the following conditional expression (9) is preferably satisfied:

$$-4.00 < f3/f32 < -1.20 \quad (9)$$

where f3 denotes a focal length of the third lens group, and f32 denotes a focal length of the rear group.

Conditional expression (9) defines an appropriate range of the focal length of the third lens group with respect to the focal length of the rear group. With satisfying conditional expression (9), it becomes possible to optimize the shift amount of the image with respect to that of the vibration reduction lens group. Moreover, it becomes possible to suppress deterioration in optical performance caused by various aberrations such as curvature of field result from control error upon vibration reduction, so that preferable optical performance can be obtained. Furthermore, it becomes possible to make the dive mechanism for vibration reduction compact.

When the ratio f3/f32 is equal to or falls below the lower limit of conditional expression (9), the shift amount of the image with respect to the shift amount of the vibration reduction lens group becomes large, so that deterioration in optical performance such as curvature of field result from control error upon vibration reduction becomes conspicuous. In order to secure the effect of the present invention, it is preferable to set the lower limit of conditional expression (9) to −3.00.

On the other hand, when the ratio f3/f32 is equal to or exceeds the upper limit of conditional expression (9), the shift amount of the image with respect to the shift amount of the vibration reduction lens group becomes small. Accordingly, in order to secure a sufficient shift amount, the drive mechanism for vibration reduction becomes large. Moreover, it becomes difficult to preferably correct decentering coma upon vibration reduction. In order to secure the effect of the present invention, it is preferable to set the upper limit of conditional expression (9) to −1.30.

In a zoom lens system according to the second embodiment, the following conditional expression (10) is preferably satisfied:

$$-1.00 < f31/f32 < -0.60 \quad (10)$$

where f31 denotes a focal length of the front group, and f32 denotes a focal length of the rear group.

Conditional expression (10) defines an appropriate range of the focal length of the front group with respect to that of the rear group. With satisfying conditional expression (10), it becomes possible to optimize the shift amount of the image plane with respect to that of the vibration reduction lens group. Moreover, it becomes possible to suppress deterioration in optical performance caused by various aberrations such as curvature of field result from control error upon vibration reduction, so that preferable optical performance can be obtained. Furthermore, it becomes possible to make the dive mechanism for vibration reduction compact.

When the ratio f31/f32 is equal to or falls below the lower limit of conditional expression (10), the shift amount of the image with respect to the shift amount of the vibration reduction lens group becomes large, so that deterioration in optical performance such as curvature of field result from control error upon vibration reduction becomes conspicuous. In order to secure the effect of the present invention, it is preferable to set the lower limit of conditional expression (10) to −0.90.

On the other hand, when the ratio f31/f32 is equal to or exceeds the upper limit of conditional expression (10), the shift amount of the image with respect to the shift amount of the vibration reduction lens group becomes small. Accordingly, in order to secure a sufficient shift amount, the drive mechanism for vibration reduction becomes large. Moreover, it becomes difficult to preferably correct decentering coma upon vibration reduction. In order to secure the effect of the present invention, it is preferable to set the upper limit of conditional expression (10) to −0.64.

In a zoom lens system according to the second embodiment, the following conditional expression (11) is preferably satisfied:

$$0.25 < f4/ft < 0.80 \quad (11)$$

where f4 denotes a focal length of the fourth lens group, and ft denotes a focal length of the zoom lens system in the telephoto end state.

Conditional expression (11) defines an appropriate range of the focal length of the fourth lens group with respect to that of the zoom lens system in the telephoto end state. With satisfying conditional expression (11), it becomes possible to preferably correct spherical aberration, coma, and chromatic aberration in the telephoto end state, and curvature of field and coma in the wide-angle end state. Moreover, since the total lens length can be short, the zoom lens system can be compact.

When the ratio f4/ft is equal to or falls below the lower limit of conditional expression (11), it becomes difficult to preferably correct coma in the telephoto end state, curvature of field and coma in the wide-angle end state simultaneously. In order to secure the effect of the present invention, it is preferable to set the lower limit of conditional expression (11) to 0.30.

On the other hand, when the ratio f4/ft is equal to or exceeds the upper limit of conditional expression (11), the total lens length of the zoom lens system becomes large, so that it is against the purpose to be compact. To make refractive power of the third lens group strong to mitigate the effect becomes a factor in deterioration of spherical aberration and chromatic aberration in the telephoto end state. In order to secure the effect of the present invention, it is preferable to set the upper limit of conditional expression (11) to 0.60.

In a zoom lens system according to the second embodiment, the following conditional expression (12) is preferably satisfied:

$$1.00 < f3/f4 < 5.00 \quad (12)$$

where f3 denotes a focal length of the third lens group, and f4 denotes a focal length of the fourth lens group.

Conditional expression (12) defines an appropriate range of the focal length of the third lens group with respect to that of the fourth lens group. With satisfying conditional expression (12), it becomes possible to preferably correct off-axis aberrations such as curvature of field and coma in the wide-angle end state, and spherical aberration, coma and chromatic aberration in the telephoto end state without shortening the back focal length, so that it becomes possible to suppress deterioration in optical performance caused by decentering coma result from a manufacturing error.

When the ratio f3/f4 is equal to or falls below the lower limit of conditional expression (12), the back focal length becomes short. To make refractive power of the second lens group stronger to avoid this invite deterioration in off-axis aberrations in the wide-angle end state. In order to secure the effect of the present invention, it is preferable to set the lower limit of conditional expression (12) to 1.20.

On the other hand, when the ratio f3/f4 is equal to or exceeds the upper limit of conditional expression (12), refractive power of the fourth lens group becomes strong. Accordingly, it becomes difficult to correct coma in the wide-angle end state and in the telephoto end state. Moreover, deterioration in optical performance caused by decentering result from a manufacturing error becomes conspicuous. In order to secure the effect of the present invention, it is preferable to set the upper limit of conditional expression (12) to 4.00.

In a zoom lens system according to the second embodiment, it is preferable that the most object side lens surface of the rear group is an aspherical surface. With this construction, even if the rear group is decentered, deterioration in decentering coma can be suppressed sufficiently.

In a zoom lens system according to the second embodiment, it is preferable that at least one aspherical surface is included in the fourth lens group. With this construction, it becomes possible to preferably correct distortion, curvature of field, astigmatism in the wide-angle end state, and spherical aberration and coma in the telephoto end state.

In a zoom lens system according to the second embodiment, it is preferable that a distance between the third lens group and the fourth lens group decreases upon zooming from the wide-angle end state to the telephoto end state. When the distance between the third lens group and the fourth lens group does not decrease, it becomes difficult to suppress variation in curvature of field upon zooming from the wide-angle end state to the telephoto end state.

In a zoom lens system according to the second embodiment, it is preferable that the second lens group is moved along the optical axis upon focusing. Since refractive power of the second lens group is large, the moving amount can be small. Accordingly, the total lens length of the zoom lens system does not become large. Moreover, since the second lens group is light in comparison with the first lens group, burden to the drive mechanism can be lightened.

An imaging apparatus according to the second embodiment is equipped with the above-mentioned zoom lens system.

Accordingly, it becomes possible to realize an imaging apparatus having a high zoom ratio and a wide angle of view with a vibration reduction function.

A method for carrying out vibration reduction of a zoom lens system according to the second embodiment that includes, in order from an object, a first lens group having positive refractive power, a second lens group having negative refractive power, a third lens group having positive refractive power, and a fourth lens group having positive refractive power, the method comprising steps of: varying a focal length from a wide-angle end state to a telephoto end state by increasing a distance between the first lens group and the second lens group, decreasing a distance between the second lens group and the third lens group, and varying a distance between the third lens group and the fourth lens group; satisfying the following conditional expression (3):

$$-0.275 < f2/f3 < -0.100 \qquad (3)$$

where f2 denotes a focal length of the second lens group, and f3 denotes the focal length of the third lens group; providing the third lens group that includes, in order from the object, a front group having positive refractive power, and a rear group having negative refractive power; and carrying out correction of the image plane by moving only the rear group in the direction substantially perpendicular to the optical axis upon occurring a camera shake.

With this method, it becomes possible to realize a zoom lens system with a vibration reduction function to have a high zoom ratio and a wide angle of view.

A method for varying a focal length of a zoom lens system according to the first embodiment that includes, in order from an object, a first lens group having positive refractive power, a second lens group having negative refractive power, a third lens group having positive refractive power, and a fourth lens group having positive refractive power, the method comprising steps of: providing the third lens group that includes, in order from the object, a front group having positive refractive power, and a rear group having negative refractive power; carrying out correction of the image plane by moving only the rear group in the direction substantially perpendicular to the optical axis upon occurring a camera shake; satisfying the following conditional expression (3):

$$-0.275 < f2/f3 < -0.100 \qquad (3)$$

where f2 denotes a focal length of the second lens group, and f3 denotes the focal length of the third lens group; and varying a focal length from a wide-angle end state to a telephoto end state by increasing a distance between the first lens group and the second lens group, decreasing a distance between the second lens group and the third lens group, and varying a distance between the third lens group and the fourth lens group.

With this method, it becomes possible to realize a zoom lens system with a vibration reduction function to have a high zoom ratio and a wide angle of view.

A zoom lens system according to the second embodiment is explained below with reference to accompanying drawings.

EXAMPLE 6

FIG. 1 is a diagram showing a lens configuration of a zoom lens system according to Example 6 of a second embodiment together with a zooming trajectory of each lens group.

A zoom lens system according to Example 6 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a positive meniscus lens L12 having convex surface facing the object, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a positive meniscus lens L31 having a concave surface facing the object, and a cemented lens constructed by a double convex positive lens L32 cemented with a negative meniscus lens L33 having a concave surface facing the object.

The rear group G32 is composed of a cemented lens constructed by, in order from the object, a double concave negative lens L34 cemented with a double convex positive lens L35. The most object side double concave negative lens L34 in the rear group G32 is an aspherical lens on which an aspherical surface is formed on a resin layer applied on the object side glass surface.

The fourth lens group G4 is composed of, in order from the object, a cemented lens constructed by a negative meniscus lens L41 having a convex surface facing the object cemented with a double convex positive lens L42, and a cemented lens constructed by a positive meniscus lens L43 having a concave surface facing the object cemented with a negative meniscus lens L44 having a concave surface facing the object. The most image side negative meniscus lens L44 is an aspherical lens on which the image side surface is formed by an aspherical surface.

In a zoom lens system according to Example 6, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 6, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 6, an image plane correction, in other words, vibration reduction is carried out by moving only the rear group G32 in the direction substantially perpendicular to the optical axis upon occurring a camera shake.

In a zoom lens system according to Example 6, focusing from infinity to a close object is carried out by moving the second lens group G2 to the object.

Various values associated with a zoom lens system according to Example 6 of the second embodiment are listed in Table 6.

In the wide-angle end state (W) in Example 6, the vibration reduction coefficient K is 1.102, and the focal length is 16.4 (mm), so that the moving amount of the rear group G32 for correcting a rotational camera shake of 0.80 degrees is 0.208 (mm). In the telephoto end state (T), the vibration reduction coefficient K is 1.800, and the focal length is 83.0 (mm), so that the moving amount of the rear group G32 for correcting a rotational camera shake of 0.35 degrees is 0.282 (mm).

TABLE 6

[Specifications]

| | W | M | T |
|---|---|---|---|
| f = | 16.4 | 24.2 | 83.0 |
| FNO = | 3.6 | 4.5 | 5.7 |
| 2ω = | 86.7 | 62.4 | 19.9 |

[Lens Data]

| N | r | d | νd | nd |
|---|---|---|---|---|
| 1 | 171.726 | 2.000 | 23.8 | 1.846660 |
| 2 | 58.558 | 6.221 | 49.6 | 1.772499 |
| 3 | 826.359 | 0.100 | | |
| 4 | 46.796 | 4.360 | 46.6 | 1.804000 |
| 5 | 102.445 | (D1) | | |
| 6* | 372.183 | 0.200 | 38.1 | 1.553890 |
| 7 | 93.131 | 1.200 | 42.7 | 1.834807 |
| 8 | 11.766 | 6.314 | | |
| 9 | −27.242 | 1.200 | 42.7 | 1.834807 |
| 10 | 47.860 | 0.490 | | |
| 11 | 34.246 | 3.715 | 23.8 | 1.846660 |
| 12 | −26.693 | 0.635 | | |
| 13 | −19.148 | 1.200 | 37.2 | 1.834000 |
| 14 | −39.779 | (D2) | | |
| 15 | ∞ | 1.000 | | Aperture Stop S |
| 16 | −425.372 | 2.224 | 70.4 | 1.487490 |
| 17 | −19.527 | 0.100 | | |
| 18 | 18.849 | 3.279 | 70.4 | 1.487490 |
| 19 | −22.378 | 1.000 | 40.8 | 1.882997 |
| 20 | −117.992 | 2.500 | | |
| 21* | −28.515 | 0.150 | 38.1 | 1.553890 |
| 22 | −30.597 | 1.000 | 42.7 | 1.834807 |
| 23 | 19.080 | 2.431 | 28.5 | 1.728250 |
| 24 | −100.146 | 2.000 | | |
| 25 | 0.000 | (D3) | | |
| 26 | 32.711 | 4.269 | 23.8 | 1.846660 |
| 27 | 19.344 | 7.251 | 82.5 | 1.497820 |
| 28 | −28.413 | 0.200 | | |
| 29 | −197.723 | 3.007 | 82.5 | 1.497820 |
| 30 | −31.076 | 2.000 | 46.6 | 1.766098 |
| 31* | −54.725 | (BF) | | |

[Aspherical Data]

Surface Number: 6

κ = 17.1808
C4 = 4.07840E−05
C6 = −1.47070E−07
C8 = 1.73490E−10
C10 = 3.50610E−12
C12 = −0.24029E−13
C14 = 0.51556E−16

Surface Number: 21

κ = 2.7193
C4 = 3.17430E−05
C6 = 8.22330E−08
C8 = 0.00000E+00

TABLE 6-continued

C10 = 0.00000E+00
C12 = 0.00000E+00
C14 = 0.00000E+00

Surface Number: 31

κ = 6.4334
C4 = 1.65030E−05
C6 = −5.27060E−09
C8 = 5.36500E−10
C10 = −5.29690E−12
C12 = 0.20134E−13
C14 = −0.18195E−16

[Variable Distances]

| | W | M | T |
|---|---|---|---|
| f | 16.39999 | 24.19997 | 82.99980 |
| D1 | 2.17905 | 9.29038 | 35.23893 |
| D2 | 19.76656 | 12.67294 | 1.20078 |
| D3 | 7.69778 | 4.92538 | 1.00000 |
| BF | 38.57713 | 47.10464 | 73.28825 |

[Values for Conditional Expressions]

(3): f2/f3 = −0.24
(8): f3/f31 = 2.06
(9): f3/f32 = −1.35
(10): f31/f32 = −0.66
(11): f4/ft = 0.45
(12): f3/f4 = 1.361

FIGS. 2A and 2B are graphs showing various aberrations and coma upon correcting rotational blur of 0.80°, respectively, of the zoom lens system according to Example 6 of the second embodiment in a wide-angle end state focusing on infinity.

FIG. 3 is a graph showing various aberrations of the zoom lens system according to Example 6 of the second embodiment in an intermediate focal length state focusing on infinity.

FIGS. 4A and 4B are graphs showing various aberrations and coma upon correcting rotational blur of 0.35°, respectively, of the zoom lens system according to Example 6 of the second embodiment in a telephoto end state focusing on infinity.

As is apparent from the respective graphs, the zoom lens system according to Example 6 of the second embodiment shows superb optical performance as a result of good corrections to various aberrations in the wide-angle end state, in the intermediate focal length state, and in the telephoto end state.

EXAMPLE 7

FIG. 21 is a diagram showing a lens configuration of a zoom lens system according to Example 7 of the second embodiment together with a zooming trajectory of each lens group.

A zoom lens system according to Example 7 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a positive meniscus lens L12 having convex surface facing the object, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a cemented lens constructed by a negative meniscus lens L31 having a convex surface facing the object cemented with a double convex positive lens L32, and a cemented lens constructed by a double convex positive lens L33 cemented with a negative meniscus lens L34 having a concave surface facing the object.

The rear group G32 is composed of a cemented lens constructed by, in order from the object, a double concave negative lens L35 cemented with a double convex positive lens L36. The most object side double concave negative lens L35 in the rear group G32 is an aspherical lens on which an aspherical surface is formed on a resin layer applied on the object side glass surface.

The fourth lens group G4 is composed of, in order from the object, a cemented lens constructed by a negative meniscus lens L41 having a convex surface facing the object cemented with a double convex positive lens L42, and a cemented lens constructed by a positive meniscus lens L43 having a concave surface facing the object cemented with a negative meniscus lens L44 having a concave surface facing the object. The most image side negative meniscus lens L44 is an aspherical lens on which the image side surface is formed by an aspherical surface.

In a zoom lens system according to Example 7, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 7, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 7, an image plane correction, in other words, vibration reduction is carried out by moving only the rear group G32 in the direction substantially perpendicular to the optical axis upon occurring a camera shake.

In a zoom lens system according to Example 7, focusing from infinity to a close object is carried out by moving the second lens group G2 to the object.

Various values associated with a zoom lens system according to Example 7 of the second embodiment are listed in Table 7.

In the wide-angle end state (W) in Example 7, the vibration reduction coefficient K is 1.21, and the focal length is 16.4 (mm), so that the moving amount of the rear group G32 for correcting a rotational camera shake of 0.80 degrees is 0.189 (mm). In the telephoto end state (T), the vibration reduction coefficient K is 2.00, and the focal length is 83.0 (mm), so that the moving amount of the rear group G32 for correcting a rotational camera shake of 0.35 degrees is 0.254 (mm).

TABLE 7

[Specifications]

|  | W | M | T |
|---|---|---|---|
| f = | 16.4 | 49.7 | 83.0 |
| FNO = | 3.6 | 5.1 | 5.9 |
| 2ω = | 86.1 | 32.4 | 19.7 |

[Lens Data]

| N | r | d | νd | nd |
|---|---|---|---|---|
| 1 | 178.090 | 2.000 | 23.8 | 1.846660 |
| 2 | 60.522 | 6.400 | 54.7 | 1.729160 |
| 3 | 1137.758 | 0.100 | | |
| 4 | 47.662 | 4.600 | 46.6 | 1.816000 |
| 5 | 119.666 | (D1) | | |
| 6* | 117.433 | 0.200 | 38.1 | 1.553890 |
| 7 | 83.348 | 1.300 | 42.7 | 1.834810 |
| 8 | 11.081 | 5.700 | | |
| 9 | −33.721 | 1.100 | 42.7 | 1.834810 |
| 10 | 33.720 | 0.300 | | |
| 11 | 24.477 | 4.400 | 23.8 | 1.846660 |
| 12 | −30.369 | 0.350 | | |
| 13 | −23.792 | 1.000 | 42.7 | 1.834810 |
| 14 | −100.517 | (D2) | | |
| 15 | ∞ | 0.800 | | Aperture Stop S |
| 16 | 377.103 | 0.800 | 46.6 | 1.816000 |
| 17 | 30.946 | 3.300 | 45.8 | 1.548140 |
| 18 | −18.550 | 0.100 | | |
| 19 | 17.209 | 3.700 | 70.5 | 1.487490 |
| 20 | −24.710 | 0.800 | 23.8 | 1.846660 |
| 21 | −210.399 | 2.500 | | |
| 22* | −26.783 | 0.150 | 38.1 | 1.553890 |
| 23 | −29.474 | 1.000 | 42.7 | 1.834810 |
| 24 | 17.559 | 2.700 | 25.7 | 1.784720 |
| 25 | −246.459 | 2.000 | | |
| 26 | 0.000 | (D3) | | |
| 27 | 33.026 | 4.000 | 23.8 | 1.846660 |
| 28 | 21.336 | 7.300 | 82.6 | 1.497820 |
| 29 | −27.809 | 0.200 | | |
| 30 | −180.038 | 3.100 | 82.6 | 1.497820 |
| 31 | −30.995 | 2.000 | 46.6 | 1.766100 |
| 32* | −55.799 | (BF) | | |

[Aspherical Data]

Surface Number: 6

κ = −12.4527
C4 = 2.11940E−05
C6 = −8.06850E−07
C8 = −8.44290E−09
C10 = 6.67410E−12
C12 = −0.22943E−13
C14 = 0.29315E−14

Surface Number: 22

κ = −0.2262
C4 = 1.51570E−06
C6 = 6.22150E−08
C8 = −6.46789E+00
C10 = 0.00000E+00
C12 = 0.00000E+00
C14 = 0.00000E+00

Surface Number: 32

κ = 4.7449
C4 = 1.65360E−05
C6 = 2.53690E−08
C8 = 2.12430E−10
C10 = −3.73200E−12
C12 = 0.25824E−13
C14 = −0.63802E−14

TABLE 7-continued

[Variable Distances]

|  | W | M | T |
|---|---|---|---|
| f | 16.40023 | 49.65066 | 83.00449 |
| D1 | 2.10299 | 24.28979 | 34.38071 |
| D2 | 19.13089 | 5.62790 | 1.90055 |
| D3 | 8.15512 | 1.92897 | 1.02055 |
| BF | 38.63509 | 62.87426 | 73.22168 |

[Values for Conditional Expressions]

(3): f2/f3 = −0.24
(8): f3/f31 = 2.13
(9): f3/f32 = −1.48
(10): f31/f32 = −0.70
(11): f4/ft = 0.43
(12): f3/f4 = 1.38

Figure 22A:
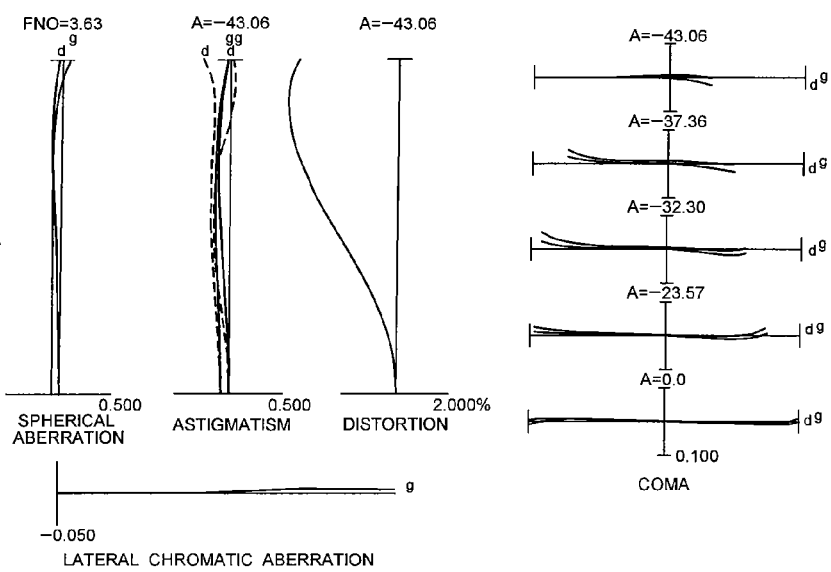
FIGS. 22A and 22B are graphs showing various aberrations and coma upon correcting rotational blur of 0.80°, respectively, of the zoom lens system according to Example 7 of the second embodiment in a wide-angle end state focusing on infinity.
Figure 22B:
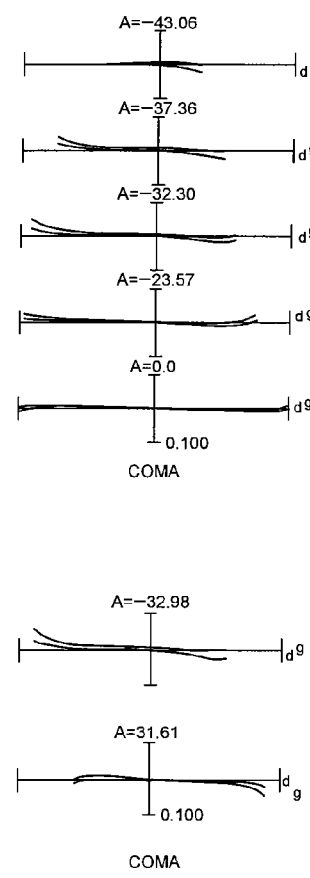

FIGS. 22A and 22B are graphs showing various aberrations and coma upon correcting rotational blur of 0.80°, respectively, of the zoom lens system according to Example 7 of the second embodiment in a wide-angle end state focusing on infinity.

Figure 23:
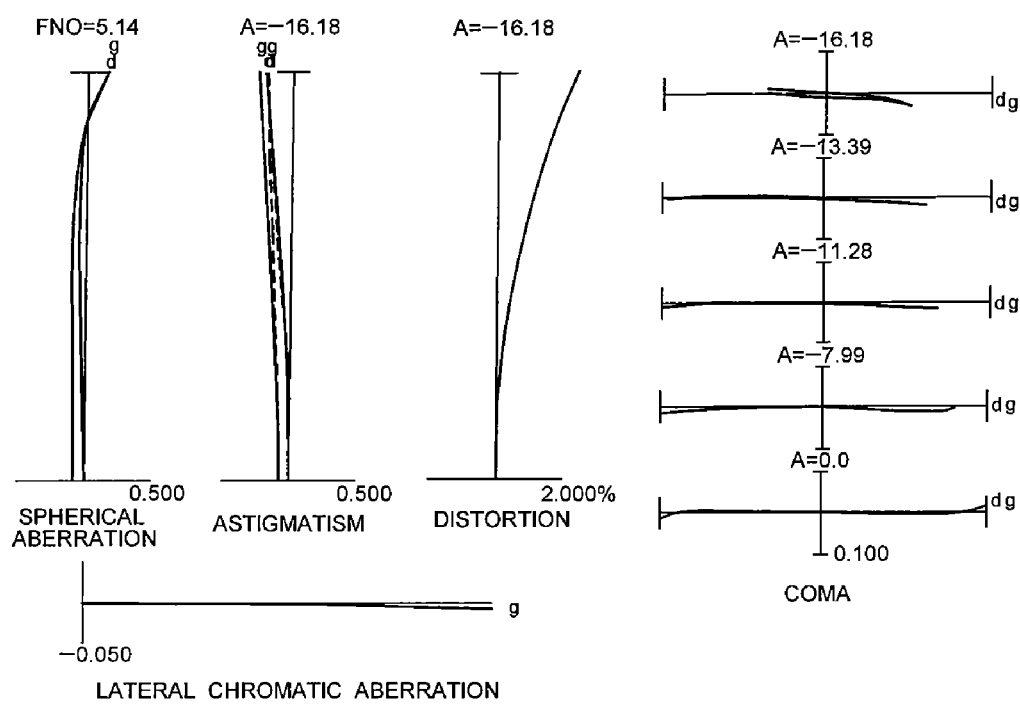
FIG. 23 is a graph showing various aberrations of the zoom lens system according to Example 7 of the second embodiment in an intermediate focal length state focusing on infinity.

FIG. 23 is a graph showing various aberrations of the zoom lens system according to Example 7 of the second embodiment in an intermediate focal length state focusing on infinity.

Figure 24A:
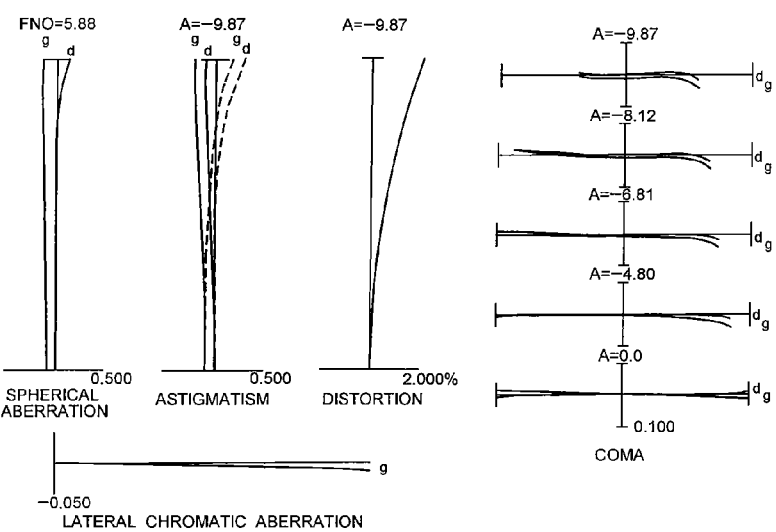
FIGS. 24A and 24B are graphs showing various aberrations and coma upon correcting rotational blur of 0.35°, respectively, of the zoom lens system according to Example 7 of the second embodiment in a telephoto end state focusing on infinity.
Figure 24B:
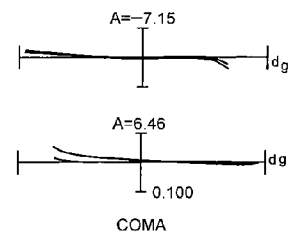

FIGS. 24A and 24B are graphs showing various aberrations and coma upon correcting rotational blur of 0.35°, respectively, of the zoom lens system according to Example 7 of the second embodiment in a telephoto end state focusing on infinity.

As is apparent from the respective graphs, the zoom lens system according to Example 7 of the second embodiment shows superb optical performance as a result of good corrections to various aberrations in the wide-angle end state, in the intermediate focal length state, and in the telephoto end state.

EXAMPLE 8

FIG. 5 is a diagram showing a lens configuration of a zoom lens system according to Example 8 of a second embodiment together with a zooming trajectory of each lens group.

A zoom lens system according to Example 8 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a positive meniscus lens L12 having convex surface facing the object, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a double convex positive lens L31, and a cemented lens constructed by a double convex positive lens L32 cemented with a double concave negative lens L33.

The rear group G32 is composed of a cemented lens constructed by, in order from the object, a double concave negative lens L34 cemented with a double convex positive lens L35. The most object side double concave negative lens L34 in the rear group G32 is an aspherical lens on which an aspherical surface is formed on a resin layer applied on the object side glass surface.

The fourth lens group G4 is composed of, in order from the object, a double convex positive lens L41, and a cemented lens constructed by a negative meniscus lens L42 having a convex surface facing the object cemented with a double convex positive lens L43, and a negative meniscus lens L44 having a concave surface facing the object. The most image side negative meniscus lens L44 is an aspherical lens on which the image side surface is formed by an aspherical surface.

In a zoom lens system according to Example 8, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 8, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 8, an image plane correction, in other words, vibration reduction is carried out by moving only the rear group G32 in the direction substantially perpendicular to the optical axis upon occurring a camera shake.

In a zoom lens system according to Example 8, focusing from infinity to a close object is carried out by moving the second lens group G2 to the object.

Various values associated with a zoom lens system according to Example 8 of the second embodiment are listed in Table 8.

In the wide-angle end state (W) in Example 8, the vibration reduction coefficient K is 0.880, and the focal length is 16.4 (mm), so that the moving amount of the rear group G32 for correcting a rotational camera shake of 0.80 degrees is 0.260 (mm). In the telephoto end state (T), the vibration reduction coefficient K is 1.500, and the focal length is 83.0 (mm), so that the moving amount of the rear group G32 for correcting a rotational camera shake of 0.35 degrees is 0.338 (mm).

TABLE 8

[Specifications]

|  | W | M | T |
|---|---|---|---|
| f = | 16.4 | 33.9 | 83.0 |
| FNO = | 3.6 | 4.5 | 5.7 |
| 2ω = | 86.5 | 46.4 | 20.0 |

[Lens Data]

| N | r | d | νd | nd |
|---|---|---|---|---|
| 1 | 186.010 | 2.000 | 23.8 | 1.846660 |
| 2 | 57.108 | 6.824 | 52.3 | 1.754998 |
| 3 | 1445.904 | 0.100 | | |
| 4 | 44.873 | 4.642 | 42.7 | 1.834807 |
| 5 | 94.419 | (D1) | | |
| 6* | 520.086 | 0.150 | 38.1 | 1.553890 |

TABLE 8-continued

| | | | | |
|---|---|---|---|---|
| 7 | 85.835 | 1.200 | 46.6 | 1.816000 |
| 8 | 11.870 | 6.042 | | |
| 9 | −25.454 | 1.200 | 42.7 | 1.834807 |
| 10 | 55.451 | 0.539 | | |
| 11 | 39.367 | 3.574 | 23.8 | 1.846660 |
| 12 | −27.649 | 0.744 | | |
| 13 | −18.401 | 1.200 | 42.7 | 1.834807 |
| 14 | −34.541 | (D2) | | |
| 15 | ∞ | 1.000 | | Aperture Stop S |
| 16 | 32.804 | 2.550 | 52.3 | 1.517420 |
| 17 | −25.691 | 0.200 | | |
| 18 | 33.873 | 2.784 | 82.5 | 1.497820 |
| 19 | −18.357 | 1.000 | 42.7 | 1.834807 |
| 20 | 2477.502 | 2.500 | | |
| 21* | −32.917 | 0.150 | 38.1 | 1.553890 |
| 22 | −33.614 | 1.000 | 42.7 | 1.834807 |
| 23 | 43.144 | 1.625 | 23.8 | 1.846660 |
| 24 | −346.476 | 2.000 | | |
| 25 | 0.000 | (D3) | | |
| 26 | 23.264 | 4.823 | 70.0 | 1.518601 |
| 27 | −78.743 | 0.200 | | |
| 28 | 74.714 | 1.360 | 32.4 | 1.850260 |
| 29 | 22.000 | 6.579 | 82.5 | 1.497820 |
| 30 | −26.508 | 0.412 | | |
| 31 | −34.173 | 1.600 | 46.5 | 1.762260 |
| 32* | −58.732 | (BF) | | |

[Aspherical Data]

Surface Number: 6

$\kappa = -2.1764$
$C4 = 4.70240E-05$
$C6 = -2.04990E-07$
$C8 = 1.13690E-09$
$C10 = -4.83300E-12$
$C12 = 0.10986E-13$
$C14 = 0.00000E+00$ Surface Number: 21

$\kappa = -1.4217$
$C4 = -1.31640E-06$
$C6 = 5.43730E-08$
$C8 = 0.00000E+00$
$C10 = 0.00000E+00$
$C12 = 0.00000E+00$
$C14 = 0.00000E+00$ Surface Number: 32

$\kappa = 5.7116$
$C4 = 3.09920E-05$
$C6 = 2.85680E-08$
$C8 = 9.03240E-10$
$C10 = -7.28720E-12$
$C12 = 0.29235E-13$
$C14 = 0.00000E+00$

[Variable Distances]

| | W | M | T |
|---|---|---|---|
| f | 16.39998 | 33.91908 | 82.99980 |
| D1 | 2.13822 | 16.04163 | 34.70001 |
| D2 | 16.95004 | 7.51901 | 1.20000 |
| D3 | 7.82663 | 3.50000 | 1.00000 |
| BF | 37.99995 | 53.02618 | 70.00001 |

[Values for Conditional Expressions]

(3): f2/f3 = −0.19
(8): f3/f31 = 2.10
(9): f3/f32 = −1.41
(10): f31/f32 = −0.67
(11): f4/ft = 0.38
(12): f3/f4 = 2.01

FIGS. 6A and 6B are graphs showing various aberrations and coma upon correcting rotational blur of 0.80°, respectively, of the zoom lens system according to Example 8 of the second embodiment in a wide-angle end state focusing on infinity.

FIG. 7 is a graph showing various aberrations of the zoom lens system according to Example 8 of the second embodiment in an intermediate focal length state focusing on infinity.

FIGS. 8A and 8B are graphs showing various aberrations and coma upon correcting rotational blur of 0.35°, respectively, of the zoom lens system according to Example 8 of the second embodiment in a telephoto end state focusing on infinity.

As is apparent from the respective graphs, the zoom lens system according to Example 8 of the second embodiment shows superb optical performance as a result of good corrections to various aberrations in the wide-angle end state, in the intermediate focal length state, and in the telephoto end state.

EXAMPLE 9

FIG. 9 is a diagram showing a lens configuration of a zoom lens system according to Example 9 of a second embodiment together with a zooming trajectory of each lens group.

A zoom lens system according to Example 9 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a positive meniscus lens L12 having convex surface facing the object, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a double convex positive lens L31, and a cemented lens constructed by a double convex positive lens L32 cemented with a negative meniscus lens L33 having a concave surface facing the object.

The rear group G32 is composed of a cemented lens constructed by, in order from the object, a double concave negative lens L34 cemented with a positive meniscus lens L35 having a convex surface facing the object. The most object side double concave negative lens L34 in the rear group G32 is an aspherical lens on which an aspherical surface is formed on a resin layer applied on the object side glass surface.

The fourth lens group G4 is composed of, in order from the object, a positive meniscus lens L41 having a concave surface facing the object, and a cemented lens constructed by a double convex positive lens L42 cemented with a double concave negative lens L43, and a negative meniscus lens L44 having a concave surface facing the object. The most object side positive meniscus lens L41 is an aspherical lens on which the object side surface is formed by an aspherical surface.

In a zoom lens system according to Example 9, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 9, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 9, an image plane correction, in other words, vibration reduction is carried out by moving only the rear group G32 in the direction substantially perpendicular to the optical axis upon occurring a camera shake.

In a zoom lens system according to Example 9, focusing from infinity to a close object is carried out by moving the second lens group G2 to the object.

Various values associated with a zoom lens system according to Example 9 of the second embodiment are listed in Table 9.

In the wide-angle end state (W) in Example 9, the vibration reduction coefficient K is 1.104, and the focal length is 16.4 (mm), so that the moving amount of the rear group G32 for correcting a rotational camera shake of 0.80 degrees is 0.207 (mm). In the telephoto end state (T), the vibration reduction coefficient K is 1.819, and the focal length is 83.0 (mm), so that the moving amount of the rear group G32 for correcting a rotational camera shake of 0.35 degrees is 0.279 (mm).

TABLE 9

[Specifications]

|  | W | M | T |
|---|---|---|---|
| f = | 16.4 | 34.1 | 83.0 |
| FNO = | 3.6 | 4.4 | 5.4 |
| 2ω = | 87.5 | 47.0 | 20.3 |

[Lens Data]

| N | r | d | vd | nd |
|---|---|---|---|---|
| 1 | 269.486 | 2.000 | 23.8 | 1.846660 |
| 2 | 67.239 | 7.217 | 49.6 | 1.772499 |
| 3 | 22008.798 | 0.100 | | |
| 4 | 49.607 | 4.504 | 42.7 | 1.834807 |
| 5 | 105.112 | (D1) | | |
| 6* | 262.081 | 0.150 | 38.1 | 1.553890 |
| 7 | 95.557 | 1.200 | 46.6 | 1.816000 |
| 8 | 12.537 | 7.088 | | |
| 9 | −31.137 | 1.200 | 46.6 | 1.804000 |
| 10 | 56.257 | 0.100 | | |
| 11 | 36.553 | 3.806 | 23.8 | 1.846660 |
| 12 | −40.735 | 0.704 | | |
| 13 | −25.479 | 1.200 | 42.7 | 1.834807 |
| 14 | −45.309 | (D2) | | |
| 15 | ∞ | 1.000 | | Aperture Stop S |
| 16 | 29.426 | 2.685 | 70.4 | 1.487490 |
| 17 | −26.404 | 0.200 | | |
| 18 | 25.849 | 2.916 | 82.5 | 1.497820 |
| 19 | −21.717 | 1.000 | 42.7 | 1.834807 |
| 20 | −2212.439 | 2.500 | | |
| 21* | −36.151 | 0.100 | 38.1 | 1.553890 |
| 22 | −34.195 | 1.000 | 46.6 | 1.816000 |
| 23 | 21.952 | 1.776 | 25.4 | 1.805181 |
| 24 | 171.806 | 2.000 | | |
| 25 | 0.000 | (D3) | | |

TABLE 9-continued

| 26* | −261.293 | 2.565 | 61.1 | 1.589130 |
|---|---|---|---|---|
| 27 | −31.706 | 0.200 | | |
| 28 | 39.431 | 2.991 | 82.5 | 1.497820 |
| 29 | −123.144 | 1.248 | 23.8 | 1.846660 |
| 30 | 48.841 | 2.165 | | |
| 31 | −69.810 | 3.425 | 65.4 | 1.603001 |
| 32 | −21.259 | (BF) | | |

[Aspherical Data]

Surface Number: 6

κ = 1.0000
C4 = 2.75610E−05
C6 = −7.17460E−08
C8 = 1.32080E−10
C10 = −1.28130E−13
C12 = 0.00000E+00
C14 = 0.00000E+00

Surface Number: 21

κ = 1.5000
C4 = 1.52920E−05
C6 = 3.43650E−08
C8 = 0.00000E+00
C10 = 0.00000E+00
C12 = 0.00000E+00
C14 = 0.00000E+00

Surface Number: 26

κ = 9.9454
C4 = −3.28720E−05
C6 = −1.08450E−08
C8 = 0.00000E+00
C10 = 0.00000E+00
C12 = 0.00000E+00
C14 = 0.00000E+00

[Variable Distances]

|  | W | M | T |
|---|---|---|---|
| f | 16.39999 | 34.08159 | 82.99972 |
| D1 | 2.44878 | 18.51037 | 38.25669 |
| D2 | 22.79625 | 9.81033 | 1.20000 |
| D3 | 7.40495 | 3.42335 | 1.19328 |
| BF | 37.99996 | 53.00295 | 71.99994 |

[Values for Conditional Expressions]

(3): f2/f3 = −0.27
(8): f3/f31 = 2.06
(9): f3/f32 = −1.46
(10): f31/f32 = −0.71
(11): f4/ft = 0.43
(12): f3/f4 = 1.44

FIGS. 10A and 10B are graphs showing various aberrations and coma upon correcting rotational blur of 0.80°, respectively, of the zoom lens system according to Example 9 of the second embodiment in a wide-angle end state focusing on infinity.

FIG. 11 is a graph showing various aberrations of the zoom lens system according to Example 9 of the second embodiment in an intermediate focal length state focusing on infinity.

FIGS. 12A and 12B are graphs showing various aberrations and coma upon correcting rotational blur of 0.35°, respectively, of the zoom lens system according to Example 9 of the second embodiment in a telephoto end state focusing on infinity.

As is apparent from the respective graphs, the zoom lens system according to Example 9 of the second embodiment shows superb optical performance as a result of good corrections to various aberrations in the wide-angle end state, in the intermediate focal length state, and in the telephoto end state.

EXAMPLE 10

FIG. 13 is a diagram showing a lens configuration of a zoom lens system according to Example 10 of a second embodiment together with a zooming trajectory of each lens group.

A zoom lens system according to Example 10 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a double convex positive meniscus lens L12, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a double convex positive lens L31, and a cemented lens constructed by a double convex positive lens L32 cemented with a double concave negative lens L33.

The rear group G32 is composed of a cemented lens constructed by, in order from the object, a double concave negative lens L34 cemented with a double convex positive lens L35. The most object side double concave negative lens L34 in the rear group G32 is an aspherical lens on which an aspherical surface is formed on a resin layer applied on the object side glass surface.

The fourth lens group G4 is composed of, in order from the object, a double convex positive lens L41, and a cemented lens constructed by a double convex positive lens L42 cemented with a double concave negative lens L43 cemented with a double convex positive lens L44, and a negative meniscus lens L45 having a concave surface facing the object. The most image side negative meniscus lens L45 is an aspherical lens on which the image side surface is formed by an aspherical surface.

In a zoom lens system according to Example 10, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 10, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 10, an image plane correction, in other words, vibration reduction is carried out by moving only the rear group G32 in the direction substantially perpendicular to the optical axis upon occurring a camera shake.

In a zoom lens system according to Example 10, focusing from infinity to a close object is carried out by moving the second lens group G2 to the object.

Various values associated with a zoom lens system according to Example 10 of the second embodiment are listed in Table 10.

In the wide-angle end state (W) in Example 10, the vibration reduction coefficient K is 0.951, and the focal length is 16.4 (mm), so that the moving amount of the rear group G32 for correcting a rotational camera shake of 0.80 degrees is 0.241 (mm). In the telephoto end state (T), the vibration reduction coefficient K is 1.628, and the focal length is 83.0 (mm), so that the moving amount of the rear group G32 for correcting a rotational camera shake of 0.35 degrees is 0.311 (mm).

TABLE 10

[Specifications]

| | W | M | T |
| --- | --- | --- | --- |
| f = | 16.4 | 34.3 | 83.0 |
| FNO = | 3.6 | 4.6 | 5.8 |
| 2ω = | 86.6 | 45.7 | 19.9 |

[Lens Data]

| N | r | d | vd | nd |
| --- | --- | --- | --- | --- |
| 1 | 236.486 | 2.000 | 25.4 | 1.805181 |
| 2 | 55.828 | 7.245 | 54.7 | 1.729157 |
| 3 | −4442.864 | 0.100 | | |
| 4 | 45.771 | 4.666 | 42.7 | 1.834807 |
| 5 | 100.227 | (D1) | | |
| 6* | 493.016 | 0.150 | 38.1 | 1.553890 |
| 7 | 91.115 | 1.200 | 46.6 | 1.816000 |
| 8 | 11.518 | 6.160 | | |
| 9 | −23.691 | 1.200 | 42.7 | 1.834807 |
| 10 | 59.483 | 0.486 | | |
| 11 | 39.039 | 3.453 | 23.8 | 1.846660 |
| 12 | −31.030 | 0.886 | | |
| 13 | −18.463 | 1.200 | 42.7 | 1.834807 |
| 14 | −26.625 | (D2) | | |
| 15 | ∞ | 1.000 | | Aperture Stop S |
| 16 | 37.010 | 2.530 | 52.3 | 1.517420 |
| 17 | −24.424 | 0.200 | | |
| 18 | 28.678 | 2.847 | 70.4 | 1.487490 |
| 19 | −19.296 | 1.000 | 37.2 | 1.834000 |
| 20 | 194.798 | 2.500 | | |
| 21* | −31.892 | 0.150 | 38.1 | 1.553890 |
| 22 | −30.944 | 1.000 | 42.7 | 1.834807 |
| 23 | 31.645 | 1.769 | 23.8 | 1.846660 |
| 24 | −421.375 | 2.000 | | |
| 25 | 0.000 | (D3) | | |
| 26 | 28.174 | 4.285 | 65.4 | 1.603001 |
| 27 | −59.955 | 0.200 | | |
| 28 | 47.345 | 3.338 | 82.5 | 1.497820 |
| 29 | −64.036 | 1.200 | 37.2 | 1.834000 |
| 30 | 22.188 | 6.055 | 70.4 | 1.487490 |
| 31 | −32.448 | 0.200 | | |
| 32 | −55.522 | 1.600 | 46.5 | 1.762260 |
| 33* | −65.799 | (BF) | | |

[Aspherical Data]

Surface Number: 6

κ = −11.6613
C4 = 4.52620E−05
C6 = −1.64780E−07
C8 = 4.37200E−10
C10 = −3.49590E−13
C12 = 0.00000E+00
C14 = 0.00000E+00

TABLE 10-continued

Surface Number: 21

κ = 0.3985
C4 = 5.29000E−06
C6 = 4.67710E−08
C8 = 0.00000E+00
C10 = 0.00000E+00
C12 = 0.00000E+00
C14 = 0.00000E+00

Surface Number: 33

κ = −20.0000
C4 = 1.25500E−05
C6 = 8.20270E−08
C8 = −1.76920E−10
C10 = 1.06530E−12
C12 = 0.00000E+00
C14 = 0.00000E+00

[Variable Distances]

|    | W        | M        | T        |
|----|----------|----------|----------|
| f  | 16.39997 | 34.34251 | 82.99967 |
| D1 | 2.23196  | 15.92685 | 35.22672 |
| D2 | 17.65951 | 7.65683  | 1.20000  |
| D3 | 7.90062  | 3.27101  | 1.00000  |
| BF | 37.99989 | 53.81300 | 69.99968 |

[Values for Conditional Expressions]

(3): f2/f3 = −0.17
(8): f3/f31 = 2.41
(9): f3/f32 = −1.81
(10): f31/f32 = −0.75
(11): f4/ft = 0.37
(12): f3/f4 = 2.46

FIGS. 14A and 14B are graphs showing various aberrations and coma upon correcting rotational blur of 0.80°, respectively, of the zoom lens system according to Example 10 of the second embodiment in a wide-angle end state focusing on infinity.

FIG. 15 is a graph showing various aberrations of the zoom lens system according to Example 10 of the second embodiment in an intermediate focal length state focusing on infinity.

FIGS. 16A and 16B are graphs showing various aberrations and coma upon correcting rotational blur of 0.35°, respectively, of the zoom lens system according to Example 10 of the second embodiment in a telephoto end state focusing on infinity.

As is apparent from the respective graphs, the zoom lens system according to Example 10 of the second embodiment shows superb optical performance as a result of good corrections to various aberrations in the wide-angle end state, in the intermediate focal length state, and in the telephoto end state.

EXAMPLE 11

FIG. 17 is a diagram showing a lens configuration of a zoom lens system according to Example 11 of a second embodiment together with a zooming trajectory of each lens group.

A zoom lens system according to Example 11 is composed of, in order from an object, a first lens group G1 having positive refractive power, a second lens group G2 having negative refractive power, a third lens group G3 having positive refractive power, and a fourth lens group G4 having positive refractive power.

The first lens group G1 is composed of, in order from the object, a cemented lens constructed by a negative meniscus lens L11 having convex surface facing the object cemented with a double convex positive lens L12, and a positive meniscus lens L13 having a convex surface facing the object.

The second lens group G2 is composed of, in order from the object, a negative meniscus lens L21 having a convex surface facing the object, a double concave negative lens L22, a double convex positive lens L23, and a negative meniscus lens L24 having a concave surface facing the object. The most object side negative meniscus lens L21 in the second lens group G2 is an aspherical lens on which an aspherical surface is formed on a resin layer applied on the object side glass surface.

The third lens group G3 is composed of, in order from the object, a front group G31 having positive refractive power, and a rear group G32 having negative refractive power.

The front group G31 is composed of, in order from the object, a cemented lens constructed by a negative meniscus lens L31 having a convex surface facing the object cemented with a double convex positive lens L32, and a double convex positive lens L33.

The rear group G32 is composed of a cemented lens constructed by, in order from the object, a double concave negative lens L34 cemented with a positive meniscus lens L35 having a convex surface facing the object. The most object side double concave negative lens L34 in the rear group G32 is an aspherical lens on which an aspherical surface is formed on a resin layer applied on the object side glass surface.

The fourth lens group G4 is composed of, in order from the object, a double convex positive lens L41, and a cemented lens constructed by a double convex positive lens L42 cemented with a double concave negative lens L43, and a positive meniscus lens L44 having a concave surface facing the object. The most object side double convex positive lens L41 is an aspherical lens on which the image side surface is formed by an aspherical surface.

In a zoom lens system according to Example 11, an aperture stop S is provided in the vicinity of the object side of the third lens group G3, and moved in a body with the third lens group G3 upon zooming from the wide-angle end state to the telephoto end state.

With this lens configuration, in the zoom lens system according to Example 11, the first lens group G1, the third lens group G3, and the fourth lens group G4 are moved to the object and the second lens group G2 is also moved such that a distance between the first lens group G1 and the second lens group G2 increases, a distance between the second lens group G2 and the third lens group G3 decreases, and a distance between the third lens group G3 and the fourth lens group G4 decreases.

In a zoom lens system according to Example 11, an image plane correction, in other words, vibration reduction is carried out by moving only the rear group G32 in the direction substantially perpendicular to the optical axis upon occurring a camera shake.

In a zoom lens system according to Example 11, focusing from infinity to a close object is carried out by moving the second lens group G2 to the object.

Various values associated with a zoom lens system according to Example 11 of the second embodiment are listed in Table 11.

In the wide-angle end state (W) in Example 11, the vibration reduction coefficient K is 1.723, and the focal length is 16.4 (mm), so that the moving amount of the rear group G32 for correcting a rotational camera shake of 0.80 degrees is 0.133 (mm). In the telephoto end state (T), the vibration reduction coefficient K is 2.725, and the focal length is 78.0 (mm), so that the moving amount of the rear group G32 for correcting a rotational camera shake of 0.35 degrees is 0.175 (mm).

TABLE 11

[Specifications]

|  | W | M | T |
|---|---|---|---|
| f = | 16.4 | 33.7 | 78.0 |
| FNO = | 3.6 | 4.5 | 5.7 |
| 2ω = | 87.0 | 46.9 | 21.3 |

[Lens Data]

| N | r | d | νd | nd |
|---|---|---|---|---|
| 1 | 406.982 | 2.000 | 23.8 | 1.846660 |
| 2 | 73.318 | 7.000 | 49.6 | 1.772500 |
| 3 | −1070.277 | 0.100 | | |
| 4 | 50.015 | 4.400 | 42.7 | 1.834810 |
| 5 | 107.753 | (D1) | | |
| 6* | 174.688 | 0.150 | 38.1 | 1.553890 |
| 7 | 75.000 | 1.200 | 46.6 | 1.816000 |
| 8 | 12.343 | 7.200 | | |
| 9 | −31.585 | 1.000 | 46.6 | 1.816000 |
| 10 | 146.318 | 0.100 | | |
| 11 | 39.949 | 4.000 | 23.8 | 1.846660 |
| 12 | −39.949 | 0.800 | | |
| 13 | −25.000 | 1.000 | 42.7 | 1.834810 |
| 14 | −63.093 | (D2) | | |
| 15 | ∞ | 0.500 | | Aperture Stop S |
| 16 | 36.523 | 1.000 | 46.6 | 1.804000 |
| 17 | 14.071 | 3.200 | 81.6 | 1.497000 |
| 18 | −36.295 | 0.100 | | |
| 19 | 21.699 | 2.800 | 81.6 | 1.497000 |
| 20 | −30.106 | 3.000 | | |
| 21* | −23.784 | 0.100 | 38.1 | 1.553890 |
| 22 | −23.784 | 1.000 | 46.6 | 1.816000 |
| 23 | 15.480 | 1.800 | 25.4 | 1.805180 |
| 24 | 90.957 | 2.600 | | |
| 25 | 0.000 | (D3) | | |
| 26 | 50.288 | 3.200 | 64.1 | 1.516800 |
| 27 | −60.000 | 0.100 | 38.1 | 1.553890 |
| 28* | −50.288 | 2.000 | | |
| 29 | 2757.601 | 3.200 | 42.7 | 1.834810 |
| 30 | −40.659 | 1.200 | 23.8 | 1.846660 |
| 31 | 46.525 | 1.600 | | |
| 32 | −549.545 | 3.800 | 54.7 | 1.729160 |
| 33 | −25.439 | (BF) | | |

[Aspherical Data]

Surface Number: 6

κ = 1.0000
C4 = 2.94640E−05
C6 = −9.51900E−08
C8 = 2.40590E−10
C10 = −2.91650E−13
C12 = 0.00000E+00
C14 = 0.00000E+00

Surface Number: 21

κ = 1.0000
C4 = 3.67010E−05
C6 = 1.21640E−07
C8 = 0.00000E+00
C10 = 0.00000E+00
C12 = 0.00000E+00
C14 = 0.00000E+00

Surface Number: 28

κ = 1.0000
C4 = 2.72480E−05
C6 = −1.33750E−08
C8 = 0.00000E+00
C10 = 0.00000E+00
C12 = 0.00000E+00
C14 = 0.00000E+00

TABLE 11-continued

[Variable Distances]

|  | W | M | T |
|---|---|---|---|
| f | 16.40160 | 33.69972 | 77.98505 |
| D1 | 2.40000 | 18.20000 | 38.20000 |
| D2 | 22.30000 | 9.30000 | 1.20000 |
| D3 | 7.70000 | 3.10000 | 1.00000 |
| BF | 37.99980 | 53.07409 | 70.00006 |

[Values for Conditional Expressions]

(3): f2/f3 = −0.26
(8): f3/f31 = 2.77
(9): f3/f32 = −1.81
(10): f31/f32 = −0.86
(11): f4/ft = 0.45
(12): f3/f4 = 1.51

FIGS. 18A and 18B are graphs showing various aberrations and coma upon correcting rotational blur of 0.80°, respectively, of the zoom lens system according to Example 11 of the second embodiment in a wide-angle end state focusing on infinity.

FIG. 19 is a graph showing various aberrations of the zoom lens system according to Example 11 of the second embodiment in an intermediate focal length state focusing on infinity.

FIGS. 20A and 20B are graphs showing various aberrations and coma upon correcting rotational blur of 0.35°, respectively, of the zoom lens system according to Example 11 of the second embodiment in a telephoto end state focusing on infinity.

As is apparent from the respective graphs, the zoom lens system according to Example 11 of the second embodiment shows superb optical performance as a result of good corrections to various aberrations in the wide-angle end state, in the intermediate focal length state, and in the telephoto end state.

As described above, each embodiment makes it possible to provide a zoom lens system with a vibration reduction function, a high zoom ratio of about five, a wide angle of view of 85 degrees or more in the wide-angle end state, and a long back focal length capable of being used by a single-lens reflex digital camera.

Although a zoom lens system with a four-lens-group configuration is shown as each Example of the present application, the lens-group configuration according to the present application is not limited to this, other lens-group configurations such as a five-lens-group configuration are possible.

In each Example in both embodiments, in order to carry out focusing from infinity to a close object, a portion of a lens group, a single lens group, or a plurality of lens groups may be moved along the optical axis. The focusing lens group(s) may be used for auto focus, and suitable for being driven by a motor such as an ultrasonic motor. In a zoom lens system according to each Example, it is preferable that the second lens group or the first lens group is used for the focusing lens group.

In each lens group composing a zoom lens system according to the present application, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

In a zoom lens system according to each Example, an antireflection coating having high transmittance over a broad wavelength range may be applied to each lens surface to reduce flare or ghost images, so that high optical performance with a high contrast can be attained.

The above-described each example of the present application only shows a specific example, so that the present application is not limited to this.

Then, a camera equipped with a zoom lens system according to the present application is explained with reference to FIG. 25.

Figure 25:
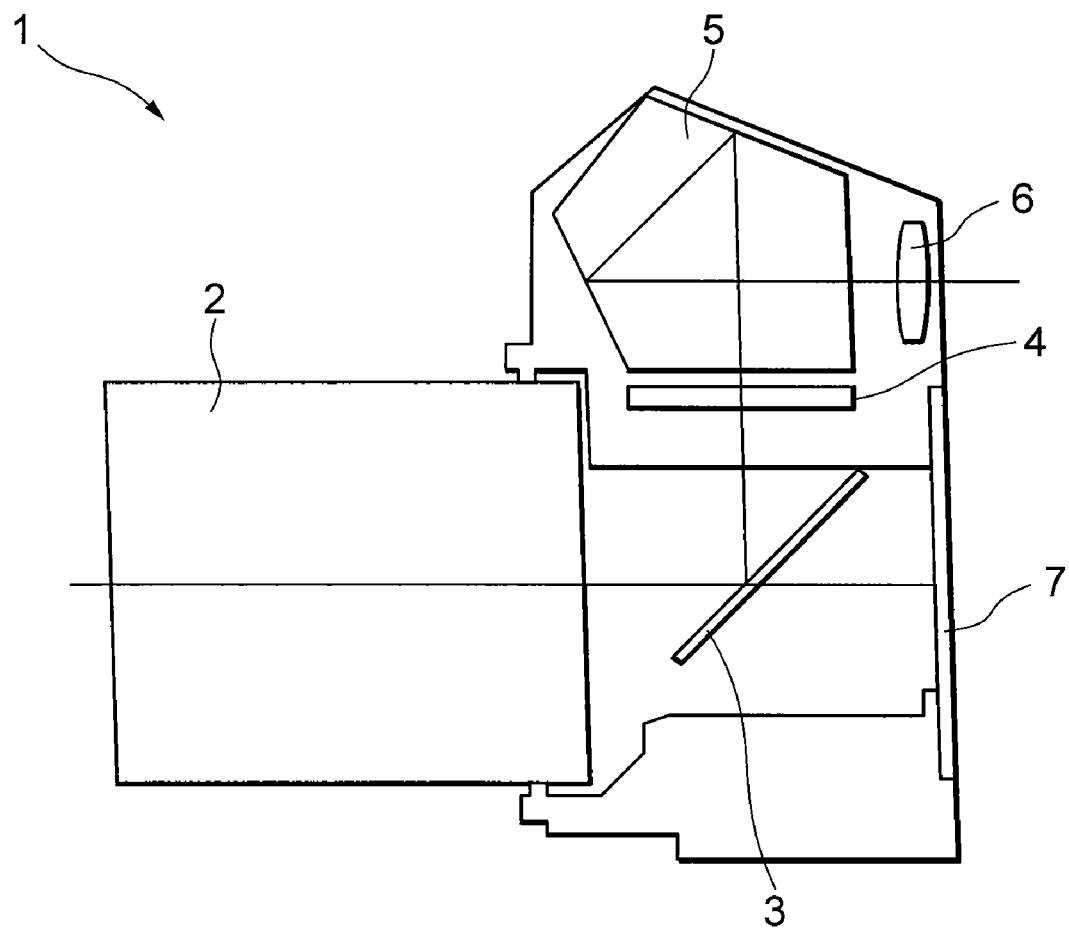
FIG. 25 is a schematic diagram showing an imaging apparatus using a zoom lens system according to Example 1 of the first embodiment.

FIG. 25 is a schematic diagram showing a single-lens reflex digital camera as an imaging apparatus using a zoom lens system according to Example 1 of the first embodiment.

As shown in FIG. 25, the camera 1 is a single-lens reflex digital camera equipped with a zoom lens system according to Example 1 of the first embodiment as an image-taking lens 2.

In the camera 1, light emitted from a subject (not shown) is converged by an image-taking lens 2, and focused on a focusing screen 4 through a quick return mirror 3. The subject image focused on the focusing screen 4 is reflected a plurality of times by a pentagonal roof prism 5, and led to an eyepiece 6. Therefore, a photographer can observe the subject image as an erected image through the eyepiece 6.

When the photographer presses a shutter release button (not shown), the quick return mirror 3 is removed from an optical path, and the light from the subject (not shown) reaches an imaging device 7. The light from the subject is captured by the imaging device 7 and stored in a memory (not shown) as a subject image. In this manner, the photographer can take a picture of the subject by the camera 1.

The zoom lens system according to Example 1 of the first embodiment attached to the camera 1 as an image-taking lens 2 makes it possible to realize a vibration reduction function, a high zoom ratio, and a wide angle of view by means of the specific lens configuration. Accordingly, the camera 1 makes it possible to realize a vibration reduction function, a high zoom ratio, and a wide angle of view.

The present application is not limited to this, and it is needless to say that the similar effect can be obtained by a camera equipped with a zoom lens according to any one of Examples 2 through 11 of the present application.

As described above, the present application makes it possible to provide a zoom lens system with a vibration reduction function, a high zoom ratio, and a wide angle of view, and to provide an imaging apparatus, a method for vibration reduction, and a method for varying a focal length.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the-appended claims and their equivalents.

The invention claimed is:

1. A zoom lens system comprising, in order from an object:
a first lens group having positive refractive power;
a second lens group having negative refractive power;
a third lens group having positive refractive power; and
a fourth lens group having positive refractive power;
upon zooming from a wide-angle end state to a telephoto end state, a distance between the first lens group and the second lens group varying, a distance between the second lens group and the third lens group varying, and a distance between the third lens group and the fourth lens group varying;
the third lens group comprising, in order from the object, a front group having positive refractive power, and a rear group having negative refractive power;
wherein the rear group is movable in a direction substantially perpendicular to the optical axis, and the following conditional expressions are satisfied:

$$2.95 < f3/fw < 8.0$$

$$0.56 < f3/ft < 2.0$$

where fw denotes a focal length of the zoom lens system in the wide-angle end state, ft denotes a focal length of zoom lens system in the telephoto end state, and f3 denotes a focal length of the third lens group.

2. The zoom lens system according to claim 1, wherein upon zooming from the wide-angle end state to the telephoto end state, a distance between the first lens group and the second lens group increases, a distance between the second lens group and the third lens group decreases.

3. The zoom lens system according to claim 1, wherein the following conditional expression is satisfied:

$$-0.275 < f2/f3 < -0.100$$

where f2 denotes a focal length of the second lens group, and f3 denotes a focal length of the third lens group.

4. The zoom lens system according to claim 1, wherein upon zooming from the wide-angle end state to the telephoto end state, the first lens group, the third lens group, and the fourth lens group are moved to the object.

5. The zoom lens system according to claim 1, wherein the following conditional expression is satisfied:

$$0 < D3W - D3T$$

where D3W denotes a distance between the third lens group and the fourth lens group in the wide-angle end state, D3T denotes a distance between the third lens group and the fourth lens group in the telephoto end state.

6. The zoom lens system according to claim 1, wherein the following conditional expression is satisfied:

$$0.24 < f31/ft < 0.41$$

where ft denotes a focal length of the zoom lens system in the telephoto end state, and f31 denotes a focal length of the front group.

7. The zoom lens system according to claim 1, wherein the following conditional expression is satisfied:

$$2.15 < Bfw/fw < 3.50$$

where fw denotes a focal length of the zoom lens system in the wide-angle end state, and Bfw denotes a back focal length of the zoom lens system in the wide-angle end state.

8. The zoom lens system according to claim 1, wherein the following conditional expression is satisfied:

$$1.4 < f3/f4 < 5.0$$

where f3 denotes a focal length of the third lens group, and f4 denotes a focal length of the fourth lens group.

9. The zoom lens system according to claim 1, wherein the most object side lens surface of the rear group is an aspherical surface.

10. The zoom lens system according to claim 1, wherein at least one aspherical surface is included in the rear group.

11. The zoom lens system according to claim 1, wherein at least one aspherical surface is included in the fourth lens group.

12. The zoom lens system according to claim 1, wherein focusing is carried out by moving the second lens group along the optical axis.

13. An imaging apparatus equipped with the zoom lens system according to claim 1.

14. A method for varying a focal length of a zoom lens system that includes, in order from an object, a first lens group having positive refractive power, a second lens group having negative refractive power, a third lens group having positive refractive power, and a fourth lens group having positive refractive power, the method comprising steps of:
 providing the third lens group that comprises, in order from the object, a front group having positive refractive power, and a rear group having negative refractive power;
 providing the rear group movable in the direction substantially perpendicular to the optical axis;
 satisfying the following conditional expressions:

$$2.95 < f3/fw < 8.0$$

$$-0.275 < f2/f3 < -0.100$$

where fw denotes a focal length of the zoom lens system in a wide-angle end state, f2 denotes a focal length of the second lens group, and f3 denotes a focal length of the third lens group; and
 varying a focal length from a wide-angle end state to a telephoto end state by varying a distance between the first lens group and the second lens group, varying a distance between the second lens group and the third lens group, and varying a distance between the third lens group and the fourth lens group.

15. The method according to claim 14, further comprising a step of:
 satisfying the following conditional expression:

$$0.56 < f3/ft < 2.0$$

where f3 denotes a focal length of the third lens group, and ft denotes a focal length of the zoom lens system in the telephoto end state.

16. A zoom lens system comprising, in order from an object:
 a first lens group having positive refractive power;
 a second lens group having negative refractive power;
 a third lens group having positive refractive power; and
 a fourth lens group having positive refractive power,
 upon zooming from a wide-angle end state to a telephoto end state, a distance between the first lens group and the second lens group varying, a distance between the second lens group and the third lens group varying, and a distance between the third lens group and the fourth lens group varying,
 the third lens group comprising, in order from the object, a front group having positive refractive power, and a rear group having negative refractive power,
 wherein the rear group is movable in a direction substantially perpendicular to the optical axis and the following conditional expression is satisfied:

$$-0.275 < f2/f3 < -0.100$$

where f2 denotes a focal length of the second lens group, and f3 denotes the focal length of the third lens group.

17. The zoom lens system according to claim 16, wherein upon zooming from the wide-angle end state to the telephoto end state, a distance between the first lens group and the second lens group increasing, a distance between the second lens group and the third lens group decreasing.

18. The zoom lens system according to claim 16, wherein the following conditional expression is satisfied:

$$1.96 < f3/f31 < 5.00$$

where f3 denotes a focal length of the third lens group, and f31 denotes a focal length of the front group.

19. The zoom lens system according to claim 16, wherein the following conditional expression is satisfied:

$$-4.00 < f3/f32 < -1.20$$

where f3 denotes a focal length of the third lens group, and f32 denotes a focal length of the rear group.

20. The zoom lens system according to claim 16, wherein the following conditional expression is satisfied:

$$-1.00 < f31/f32 < -0.60$$

where f31 denotes a focal length of the front group and f32 denotes a focal length of the rear group.

21. The zoom lens system according to claim 16, wherein the following conditional expression is satisfied:

$$0.25 < f4/ft < 0.80$$

where f4 denotes a focal length of the fourth lens group, and ft denotes a focal length of the zoom lens system in the telephoto end state.

22. The zoom lens system according to claim 16, wherein the following conditional expression is satisfied:

$$1.00 < f3/f4 < 5.00$$

where f3 denotes a focal length of the third lens group, and f4 denotes a focal length of the fourth lens group.

23. The zoom lens system according to claim 16, wherein the most object side lens surface of the rear group is an aspherical surface.

24. The zoom lens system according to claim 16, wherein at least one aspherical surface is included in the rear group.

25. The zoom lens system according to claim 16, wherein at least one aspherical surface is included in the fourth lens group.

26. The zoom lens system according to claim 16, wherein upon zooming from the wide-angle end state to the telephoto end state, the distance between the third lens group and the fourth lens group decreases.

27. The zoom lens system according to claim 16, wherein focusing is carried out by moving the second lens group along the optical axis.

28. An imaging apparatus equipped with the zoom lens system according to claim 16.

29. A method for varying a focal length of a zoom lens system that includes, in order from an object, a first lens group having positive refractive power, a second lens group having negative refractive power, a third lens group having positive refractive power, and a fourth lens group having positive refractive power, the method comprising steps of:
 providing the third lens group that comprises, in order from the object, a front group having positive refractive power, and a rear group having negative refractive power;
 providing the rear group movable in the direction substantially perpendicular to the optical axis;
 satisfying the following conditional expression:

$$-0.275 < f2/f3 < -0.100$$

where f2 denotes a focal length of the second lens group, and f3 denotes the focal length of the third lens group; and
 varying a focal length from a wide-angle end state to a telephoto end state by varying a distance between the first lens group and the second lens group, varying a distance between the second lens group and the third lens group, and varying a distance between the third lens group and the fourth lens group.

30. The method according to claim 29, further comprising a step of:
satisfying the following conditional expression:

$1.96 < f3/f31 < 5.00$ where f3 denotes a focal length of the third lens group, and f31 denotes a focal length of the front group.

31. The method according to claim 29, further comprising a step of:
satisfying the following conditional expression:

$-4.00 < f3/f32 < -1.20$ where f3 denotes a focal length of the third lens group, and f32 denotes a focal length of the rear group.

32. A zoom lens system comprising, in order from an object:
a first lens group having positive refractive power;
a second lens group having negative refractive power;
a third lens group having positive refractive power; and
a fourth lens group having positive refractive power;
upon zooming from a wide-angle end state to a telephoto end state, a distance between the first lens group and the second lens group varying, a distance between the second lens group and the third lens group varying, and a distance between the third lens group and the fourth lens group varying;
the third lens group comprising, in order from the object, a front group having positive refractive power, and a rear group having negative refractive power;
the rear group being movable in a direction substantially perpendicular to the optical axis, and the following conditional expression being satisfied:

$0.56 < f3/ft < 2.0$ where ft denotes a focal length of the zoom lens system in the telephoto end state, and f3 denotes a focal length of the third lens group.

33. The zoom lens system according to claim 32, wherein the following conditional expression is satisfied:

$0.24 < f31/ft < 0.41$ where ft denotes a focal length of the zoom lens system in the telephoto end state, and f31 denotes a focal length of the front group.

34. A zoom lens system comprising, in order from an object:
a first lens group having positive refractive power;
a second lens group having negative refractive power;
a third lens group having positive refractive power; and
a fourth lens group having positive refractive power;
upon zooming from a wide-angle end state to a telephoto end state, a distance between the first lens group and the second lens group varying, a distance between the second lens group and the third lens group varying, and a distance between the third lens group and the fourth lens group varying;
the third lens group comprising, in order from the object, a front group having positive refractive power, and a rear group having negative refractive power;
the rear group being movable in a direction substantially perpendicular to the optical axis, and the following conditional expression being satisfied:

$0.24 < f31/ft < 0.41$ where ft denotes a focal length of the zoom lens system in the telephoto end state, and f31 denotes a focal length of the front group.

35. The zoom lens system according to claim 34, wherein an angle of view of the zoom lens system is 85 degrees or more in the wide-angle end state.

36. A zoom lens system comprising, in order from an object:
a first lens group having positive refractive power;
a second lens group having negative refractive power;
a third lens group having positive refractive power; and
a fourth lens group having positive refractive power;
upon zooming from a wide-angle end state to a telephoto end state, a distance between the first lens group and the second lens group varying, a distance between the second lens group and the third lens group varying, and a distance between the third lens group and the fourth lens group varying;
the third lens group comprising, in order from the object, a front group having positive refractive power, and a rear group having negative refractive power;
the rear group being movable in a direction substantially perpendicular to the optical axis;
an angle of view of the zoom lens system being 85 degrees or more in the wide-angle end state, and the following conditional expression being satisfied:

$2.95 < f3/fw < 8.0$ where fw denotes a focal length of the zoom lens system in the wide-angle end state, and f3 denotes a focal length of the third lens group.

37. The zoom lens system according to claim 36, wherein upon zooming from the wide-angle end state to the telephoto end state, a distance between the first lens group and the second lens group increases, a distance between the second lens group and the third lens group decreases.

38. A zoom lens system comprising, in order from an object:
a first lens group having positive refractive power;
a second lens group having negative refractive power;
a third lens group having positive refractive power; and
a fourth lens group having positive refractive power;
upon zooming from a wide-angle end state to a telephoto end state, a distance between the first lens group and the second lens group varying, a distance between the second lens group and the third lens group varying, and a distance between the third lens group and the fourth lens group varying;
the third lens group comprising, in order from the object, a front group having positive refractive power, and a rear group having negative refractive power;
the rear group being movable in a direction substantially perpendicular to the optical axis, and the following conditional expression being satisfied:

$1.96 < f3/f31 < 5.00$ where f3 denotes a focal length of the third lens group, and f31 denotes a focal length of the front group.

39. The zoom lens system according to claim 38, wherein the following conditional expression is satisfied:

$2.01 \leq f3/f4 < 5.00$ where f3 denotes a focal length of the third lens group, and f4 denotes a focal length of the fourth lens group.

40. The zoom lens system according to claim 38, wherein upon zooming from the wide-angle end state to the telephoto end state, a distance between the first lens group and the second lens group increases, and a distance between the second lens group and the third lens group decreases.

41. The zoom lens system according to claim 38, wherein upon zooming from the wide-angle end state to the telephoto end state, the first lens group, the third lens group, and the fourth lens group are moved to the object.

42. The zoom lens system according to claim 38, wherein the following conditional expression is satisfied:
ti $0<D3W-D3T$
where D3W denotes a distance between the third lens group and the fourth lens group in the wide-angle end state, D3T denotes a distance between the third lens group and the fourth lens group in the telephoto end state.

43. The zoom lens system according to claim 38, wherein at least one aspherical surface is included in the rear group.

44. The zoom lens system according to claim 38, wherein at least one aspherical surface is includes in the fourth lens group.

45. The zoom lens system according to claim 38, wherein focusing is carried out by moving the second lens group along the optical axis.

46. A method for varying a focal length of a zoom lens system that includes, in order from an object, a first lens group having positive refractive power, a second lens group having negative refractive power, a third lens group having positive refractive power, and a fourth lens group having positive refractive power, the method comprising steps of:
providing the third lens group that comprises, in order from the object, a front group having positive refractive power, and a rear group having negative refractive power;
providing the rear group movable in the direction substantially perpendicular to the optical axis;
satisfying the following conditional expression:

$$1.96<f3/f31<5.00$$

where f3 denotes a focal length of the third lens group, and f31 denotes a focal length of the front group.

47. The method according to claim 46, wherein upon zooming from the wide-angle end state to the telephoto end state, a distance between the first lens group and the second lens group increases, a distance between the second lens group and the third lens group decreases.

48. The method according to claim 46, wherein upon zooming from the wide-angle end state to the telephoto end state, the first lens group, the third lens group, and the fourth lens group are moved to the object.

49. The method according to claim 46, wherein upon zooming from the wide-angle end state to the telephoto end state, the first lens group, the third lens group, and the fourth lens group are moved to the object.

50. The method according to claim 46, wherein at least one aspherical surface is included in the rear group.

51. The method according to claim 46, wherein at least one aspherical surface is includes in the fourth lens group.

52. The method according to claim 46, wherein focusing is carried out by moving the second lens group along the optical axis.

* * * * *